(12) United States Patent
Folmsbee

(10) Patent No.: US 7,469,344 B2
(45) Date of Patent: Dec. 23, 2008

(54) LOGIC BLOCK USED TO CHECK INSTRUCTION BUFFER CONFIGURATION

(75) Inventor: Alan Folmsbee, Mt. Hamilton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 827 days.

(21) Appl. No.: 10/850,757

(22) Filed: May 21, 2004

(65) Prior Publication Data

US 2005/0005157 A1    Jan. 6, 2005

Related U.S. Application Data

(62) Division of application No. 09/377,344, filed on Aug. 18, 1999, now Pat. No. 6,757,831.

(51) Int. Cl.
*G06F 9/00* (2006.01)
(52) U.S. Cl. .................. 713/190; 713/193; 713/194
(58) Field of Classification Search .................. 713/190, 713/193, 194
See application file for complete search history.

(56) References Cited

U.S. PATENT DOCUMENTS 5,339,419 A * 8/1994 Chan et al. .................. 717/147
5,724,425 A * 3/1998 Chang et al. .................. 705/52

* cited by examiner

*Primary Examiner*—Thomas R Peeso
(74) *Attorney, Agent, or Firm*—Martine Penilla & Gencarella, LLP

(57) ABSTRACT

A CPU is provided with an ability to modify its operation in accordance with an encryption key. When a program is compiled, the program is modified in order that execution may be performed with the CPU with its operation modified. In order to execute program instructions, the buffer interdependencies must match that expected by the compiler. This makes analysis of the program operation extremely difficult. The instruction buffer on a keyed microprocessor contains logic which is able to route a subset of the instruction bits on the microprocessor. This selects destination logic gates in the microprocessor which eventually reach a programmable instruction decoder and an instruction buffer interdependency checking logic block.

48 Claims, 10 Drawing Sheets

11

IC

FLAG = 0

FLAG = 1

FLAG = 0

FLAG = 1

FLAG = 0

FLAGS = 010011

Fig. 11

LOGIC BLOCK USED TO CHECK INSTRUCTION BUFFER CONFIGURATION

CROSS-REFERENCE TO RELATED APPLICATIONS

This is a application of prior application Ser. No. 09/377,344 filed on Aug. 18, 1999 now U.S. Pat. No. 6,757,831.

U.S. patent application Ser. No. 09/377,343, entitled Microprocessor in Which Logic Changes During Execution; U.S. patent application Ser. No. 09/377,298, entitled Execution of Instructions Using Op Code Lengths Longer Than Standard Op Code Lengths to Encode Data; U.S. patent application Ser. No. 09/376,655, entitled Secure Program Execution Using Instruction Buffer Interdependencies; U.S. patent application Ser. No. 09/376,654, entitled Secure Program Execution Depending on Predictable Error Correction; U.S. patent application Ser. No. 09/377,299, entitled Secure Execution of Program Instructions Provided by Network Interactions with Processor, all invented by Alan C. Folmsbee and commonly assigned, share common subject matter. These applications are incorporated by reference herein in their entirety.

FIELD OF THE INVENTION

This invention relates to a system for providing computer program instructions in an encrypted manner, wherein execution of the encrypted program is performed by digital logic hardware. More specifically, the invention relates to on-chip verification of proper configurations of instructions, logic and data.

BACKGROUND OF THE INVENTION

When a microprocessor is operating in the process of executing computer software, it is possible for the surreptitious observer to decipher proprietary details regarding processor operation. To protect the computer software, there is often a need to restrict its use. This may be accomplished by end user agreements, wherein the user agrees to only use the software on one or more agreed upon computers. In other cases, the software can be freely copied, so that piracy restrictions are accomplished either by end user agreement or by simple techniques such as the requirement to use a product serial number to enable use of the software. While this may discourage software piracy and copying, it does not completely prevent a determined software pirate from reproducing the program along with one or more enabling serial numbers or keys.

It is possible to specifically identify individual CPUs. In that way, each CPU can be separately identified by a serial number encoded into the CPU. Identification can be accomplished by laser marking of the CPU package with a serial number. Further, it is possible to provide a serial number which can be read out by the end user during execution with appropriate instructions.

It is possible to provide elaborate protective systems for encoding the software, by use of proprietary hardware components for example, or even by requiring the end user to comply with registration requirements in order to enable software operation. In that respect, the encryption scheme for the program ensures that the program is executable in unencrypted form, at least with respect to the instruction sets provided to the CPU. In other words, the instructions provided to the CPU are in a form that is understandable by the CPU prior to CPU execution. Thus, it is easy for an unauthorized user to determine what is necessary to operate the programs successfully.

It is often desired to provide software and updates of software to end users in such a manner that the software is transferred through public channels, such as the Internet. To provide such software in restricted form, it is desired to provide security to the distributor of the software so that the software is not subject to unauthorized use. In particular, if software is shipped via public or private channels, it is desired that the end user of the software can only use the software on the end user's specified computer, and that the software not be willingly or unwillingly shared by the end user. By computer, it is intended that this includes personal computers, smart cards, work stations, dedicated CPUs embedded in hardware appliances, and any other device in which integrated circuit (IC) microprocessors may be used.

In some programs, the cost of the programs to the end user is such that it becomes economical for third parties to determine what is necessary to circumvent restrictions on use by unauthorized persons. Therefore, it is desired to make the unauthorized duplication or use of a program uneconomical. In order to do that, it is desired to provide an encryption scheme which prevents unauthorized persons from "attacking" the encryption of the software through analysis of the input and output of user commands and instruction sets from the software. It is further desired to provide a software encryption technique in which there are no external indicia of a decryption technique which can be used to analyze the encryption of the software. It is further desired that software be encrypted in such a manner that it is unnecessary to decrypt the software in order to accomplish execution of the software.

SUMMARY OF THE INVENTION

According to the invention, a particularly configurable microprocessor is used for processing computer programs which are selectively operable on that processor, provided that its instruction buffers are properly configured. The microprocessor includes an instruction buffer, destination logic circuitry, and a logic block on the instruction buffer which is able to route a subset of instruction bits from selected bit locations in the buffer to the destination logic circuitry. The routing of signals reaches the logic block which determines whether predetermined bits in the instruction buffer conform to predetermined criteria.

More particularly according to the invention, a microprocessor is able to process computer programs which are selectively operable on that particular processor. An instruction buffer contains logic which is able to route a subset of instruction bits from selected bit locations in the buffer to destination logic gates in the microprocessor. The routing reaches a logic block, and the logic block determines whether predetermined bits in the instruction buffer conform to predetermined criteria.

According to a further aspect of the invention, a CPU is provided with an ability to modify its operation in accordance with an encryption key. When a program is compiled, the program is modified in order that execution may be performed with the CPU with its operation modified. In order to execute program instructions, the buffer interdependencies must match that expected by the compiler. This makes analysis of the program operation extremely difficult. The instruction buffer on a keyed microprocessor contains logic which is able to route a subset of the instruction bits on the microprocessor. This selects destination logic gates in the microprocessor which eventually reach a programmable instruction decoder and an instruction buffer interdependency checking logic block.

In one aspect of the invention, an instruction buffer on a keyed microprocessor contains logic which is able to route to selected logic gates a subset of the instruction bits on the microprocessor. The routing operation selects destination logic gates in the microprocessor which eventually reach a programmable instruction decoder and an instruction buffer interdependency checking logic block. In order to execute program instructions, buffer interdependencies must match those predetermined by a compiler. A requirement to create these interdependencies makes analysis of the program operation extremely difficult.

According to a further aspect of the invention, microprocessor for processing computer programs which are selectively operable on that processor. The microprocessor uses logic block checking. An instruction buffer contains logic which is able to route a subset of instruction bits from selected bit locations in the buffer to destination logic gates. The routing reaches a programmable instruction decoder and a logic block. The logic block checking whether bits in the instruction buffer conform to predetermined criteria.

According to a further aspect of the invention, a microprocessor is capable of processing computer programs which are selectively operable on that processor. A memory location for receives logic instructions for executing encrypted program instructions and logic circuitry modifies operation of the microprocessor in accordance with the stored logic instructions. An instruction buffer on the microprocessor contains logic for routing a subset of the instruction bits from bit locations in the buffer to destination logic gates in the microprocessor. An instruction buffer interdependency checking logic block responds to routing of the instruction bits.

According to a further aspect of the invention, program instructions are executed on a selected processor. A subset of instruction bits are routed from bit locations in the buffer to destination logic gates. The routing reaches a programmable instruction decoder and an instruction buffer interdependency checking logic block. Successful program execution requires a successful interdependency check at the interdependency checking logic block.

In one embodiment, a microprocessor uses a programmable instruction decoder to decode encrypted instruction op codes. The decoding is accomplished without decrypting the op codes and the logic gates of the logic circuitry immediately process data upon receipt without prior decryption. The data representation of the op codes is changeable during the execution.

A custom instruction set is provided for each CPU chip or groups of CPU chips. That custom instruction set is used by the software manufacturer to provide a unique version of a mass produced program to a customer for program operation with a microprocessor chip. The CPU is therefore programmed for that custom instruction set. The length of each instruction, and the other features of this invention are configurable to have according to the present invention cryptographically significant level of security when viewed from the IC pins. Pirates who examine signals inside the IC will accordingly be deterred from success by the inventive features described herein.

The way instructions are executed ensure that, an adversary attempting to pirate the software will have difficulty understanding the results of instruction execution. It is a goal of the present invention to anticipate pirate attacks, and to provide measures which will thwart their tactics. The microprocessor chip according to the present invention will use instructions, data, addresses, and RAM memory as well as instructions with bits in each instruction configured cause confusion for attackers, but which are disregarded by the instruction decoder of the present invention during execution.

According to a further aspect of the invention, a CPU chip is provided in which instruction block sizes are larger than a predetermined minimum size for performing its computational functions. Programs compiled to execute on the CPU are compiled in a manner to utilize block allocations of instructions according to a key. Since the blocks of instructions are larger than they need to be, interdependencies between bits of separate instructions can be provided so that the CPU may check these dependencies for conformance to criteria shared by the compiler and the CPU.

BRIEF DESCRIPTION OF THE DRAWINGS

FIG. 11 is a diagram which shows how multiple access flags can be placed within a CPU according to the present invention.

DETAILED DESCRIPTION OF THE INVENTION

Figure 1:
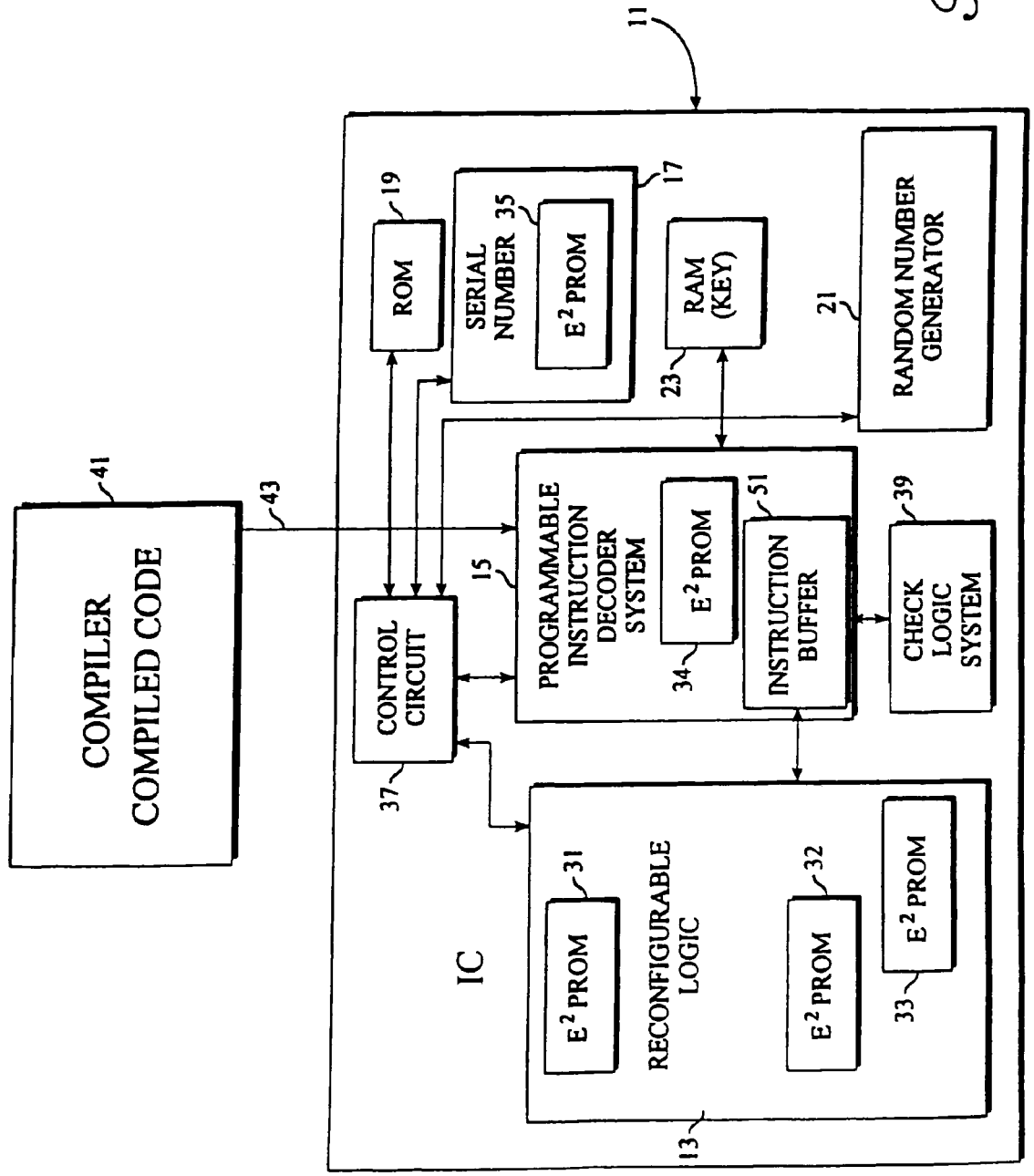
FIG. 1 is a diagram which illustrates major components of the inventive CPU, in which instructions are compiled for execution by the specific CPU.

FIG. 1 is a diagram of a microprocessor system according to the present invention. In the embodiment shown, the microprocessor system includes a CPU 11 fabricated on a single chip. The CPU 11 according to the invention includes reconfigurable logic 13, a programmable instruction decoder 15, fixed data stores such as a serial number block 17, ROM 19, and variable data stores such as a random number generator 21, RAM 23, and $E^2$PROMS 31-35. A control circuit 37 and check logic system 39 are also included on the CPU 11. The diagram further shows the flow of encrypted information from a compiler 41, which produces a software program for the inventive CPU 11. It is of course understood that the software content can be transferred indirectly to the microprocessor system, and may involve intermediate program storage as well as other peripheral functions.

Software is provided for execution on the CPU 11 in a selected language subject to compilation into standard op-codes. Then these op-codes are encrypted using a key which matches the key used for configuring the inventive CPU 11 during execution. The encrypted OP-codes are combined with camouflage or surplus bits according to one aspect of the present invention and the resulting code string, thus, has its bits permuted according to the key. The resulting bit string is then gathered into long instruction words, such as 128 bit words, and these long words are gathered into multi-word groups that will fit in the instruction buffer of the CPU 11. Some camouflage bits are replaced by interdependency bits that will be dependent on other interdependency bits in other long instruction words. These encrypted long instruction words may then be distributed without further protection to the CPU 11 having the matching key configuration. The encrypted instructions are thus in a form that can only be executed by a microprocessor configured according to the matching key. When the instruction buffer of the CPU 11 is loaded with several long instruction words, interdependencies are checked by logic gates, permutations are reversed, and encrypted op-codes are recovered. Decryption is not performed to provide standard op-codes, because the instruction decoder on the CPU 11 responds to encrypted op-codes. Some of the camouflage bits are error correcting codes to be used on errors that were intentionally put in the instructions or data.

In FIG. 1, the CPU 11 is shown including predetermined functional blocks including logic circuitry, represented at 13. In order to allow the CPU 11 to execute programs which are encrypted, the CPU 11 also includes a programmable instruction decoder 15 as well as circuitry to store information specific to that particular CPU 11. This specific information includes serial number information 17, additional identification information in ROM 19, a random number generator 21, and random access memory 23. The logic 13 is structured so as to be reconfigurable according to key bits, ROM bits and externally provided instructions.

The CPU 11 is further configured with a distributed plurality of memory stores used for specific decoding information and for increasing the level of security. In one embodiment, these memory stores are provided as $E^2$PROMS 31-35. The use of $E^2$PROMs permits the information to be rewritten to the CPU 11 but to remain as nonvolatile. The $E^2$PROMs 31-35 are used to specify particular configurations of the reconfigurable logic 13 of the CPU 11.

According to the invention, once the CPU 11 is configured in a particular way, in order to use the particular configuration, it is necessary to compile program instructions which are modified in order to be executable by the particularly modified CPU 11. This is represented by the depiction of the compiler 41 connected to the CPU 11 by a communications line 43. If there is a change in the logic and op codes during program execution, these changes are coordinated in order to enable continuous execution.

The keys used for encryption and corollary configuration may be chosen at random. Each key is expanded according to one embodiment to a longer set of non-volatile bits that control the microprocessor's logic customization, and may be called "switch bits". Some of the key bits control the instruction decoding and other key bits control hardware memory and logic allocation. These parts of the key may be controlled independently.

A Microprocessor as a Block Cipher

Figure 2:
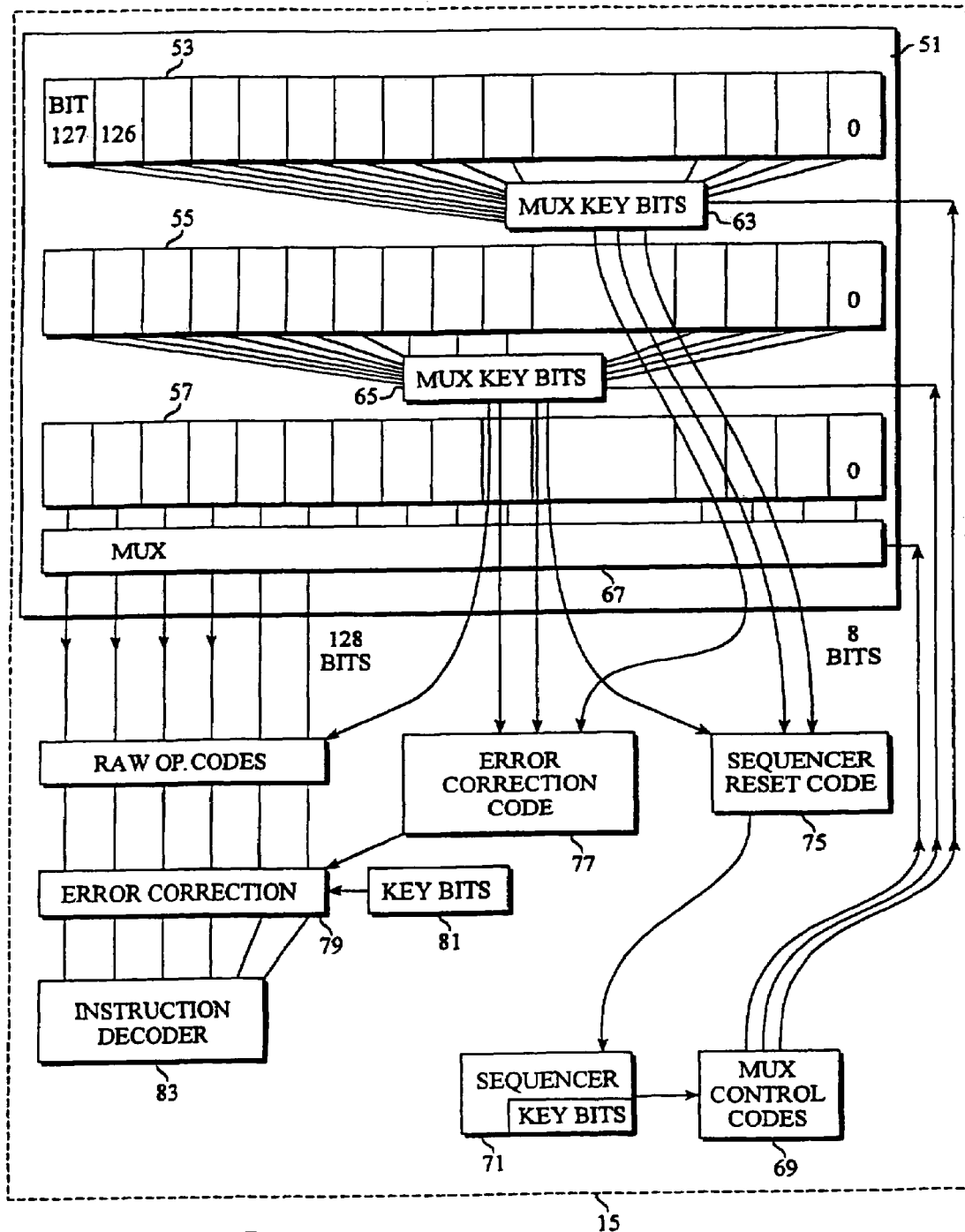
FIG. 2 is a diagram which illustrates how instructions are routed from the instruction buffer of the microprocessor under control of keyed switch bits.

FIG. 2 is a block diagram of the programmable instruction decoder system 15 including an instruction buffer 51 containing multiple registers 53, 55, and 57; and associated multiplexers 63, 65, and 67 which are connected to the multiple registers 53-57. FIG. 2 also shows a multiplexer control circuit 69 and a sequencer 71 which is part of the control logic system 37. The registers 53-57 in the instruction buffer 51 are used to store instruction words processed by the CPU 11, and the multiplexers 63-67 receive multiplex control codes from the multiplexer control circuit 69 which in turn receives instruction codes from the sequencer 71 in turn. The sequencer 71 in turn determines a particular sequence that the registers 53-57 deliver their data for further processing, so that it is possible to provide this data from the registers 53-57 in different orders, as determined by the sequencer 71. In addition, the multiplexers 63-67 can be used to control other functions. By way of example, multiplexer 63 is shown controlling a sequencer reset code stored at block 75. Error correcting codes stored at block 77 are controlled by multiplexer 65, which controls error correction operation, as represented at block 79. The error correction circuitry 79 is also supplied with key bits stored at block 81. Op codes received from multiplexers 63-67 are held at register 83, after being processed by the error correction circuitry 79. It is noted, however, that it is also possible to provide information from the different multiplexers 63-65 to different circuits. By way of example, multiplexer 63 provides configuration information to the error correction control circuit 77.

Since the execution of the code, as encrypted, is accomplished by the operation of the microprocessor, no actual decryption algorithm is needed. Therefore, it is possible to operate encrypted instructions in a computer without decryption. This protects encrypted programs from attacks during encryption. This also makes it possible to provide secure software to persons who are not eligible to receive data decryption programs.

Mapping of a "block cipher" according to the present invention to a complicated microprocessor hardware basis enable logic reconfiguration. In the past, block ciphers have operated on abstract information, with the microprocessor that performs the cipher being an exact copy of many other ICs. The invention changes the paradigm from the realm of abstract information into the realm of reconfigurable logic that forms a machine. Instead of manipulating data in complicated ways using concepts that are intended to create bewildering informational complexity, this invention manipulates complicated hardware using concepts that should present adversaries with an IC that seldom has the same major signals used on the same conductors for different ICs. Each CPU chip produced, according to the present invention, has an instruction set that can be different from the instruction set of any other processor. It is not data that is being descrambled by a standard microprocessor, it is a microprocessor that is configured to execute particularly scrambled code. Complexity theory is used in the logic reconfiguration and in the input and output codings so that the degree of complexity may be compared to the complexities produced by ordinary block ciphers.

Errors Which Are Introduced Intentionally

Encrypting of the software is accomplished, according to one aspect of the present invention, by errors which are intentionally placed in the data and/or into the instructions. The errors are then error-corrected by on-chip circuitry. Since there are a variety of ways to perform error correction, the particular form of error correction is selected at the time of instruction encryption and that particular form of error correction is used to correct the errors on-chip. By way of example, the error correction may be a form of Hamming code. Since there is more than one way to perform this type of error correction, the data or instructions would be essentially useless without providing the information concerning the particular type of Hamming code being used.

These codes can come in many varieties, and they can be key-dependent. The long instruction words may contain modifications to the error correcting codes to that data and can have varying error types and correction types.

Program Executed Without Requirement for Decryption

The inventive CPU 11 is not a data decryption device, according to the present invention. The inventive CPU 11 is designed to receive scrambled instructions but not to decrypt them. Instead, it uses scrambled instructions and outputs results from calculations by operating in a mode that accommodates the particular encrypted form of the data. The programs themselves can be written in such a way that data decryption is performed. Optionally, data encryption and decryption software can be written for the inventive CPU 11, as for any other CPU, but that is not the focus of this invention. The "Complexity Theory" which may be applied to an implementation of this invention would provide an analysis of the work complexity magnitude which the scrambling and transformations provide. This work complexity is adjustable by the computer architects who specify the detailed implementation of this invention. It is envisioned that the complexity will be on the order of $2^{55}$ operations, similar to that of "weak cryptography". That amount of work would enable an adversary to produce instructions which perform the same calculations as the encrypted instructions.

FIG. 2 illustrates how instructions are used from the instruction buffer under control of keyed switch bits that change the wiring of the logic signals. These signals eventually go to the instruction decoder. The program counter will not be operated by incrementing by one. It will be incremented by m, a number determined by the key, the serial number, the sequencer 71, and the instruction buffer non-instruction contents and instruction contents. Addresses for instructions that are executed in sequence are not sequential addresses, but are arranged by the compiler to be loaded into memory locations which conform to the program counter incrementation plan. For example, if "long instruction words" are 128 bits long, and each instruction has 9OP-codes, and there are 4 long instruction words in the instruction buffer, then the program counter may increment by amounts from 2 to 18 (modulo 9*4). The compiler would have provided for this scheme by gathering op-codes into locations planned with this incrementation plan taken into account.

The sequencer circuit 71 is included so that more complexity is designed into the instruction execution operations. Some of the key bits are used to initialize the sequencer 71 when it is reset. Then the sequencer 71 produces a new output code on each n clock cycles. This code will be logically combined with encrypted instructions to feed codes to the instruction decoder. The compiler shares sequencer information in common with the CPU 11 because they share a common key, so the encrypted op-codes are prepared for the logical combinations which the sequencer 71 will provide. This increases the complexity by making each instruction have a varying code that depends on the sequencer 71. For example, the ANDing instruction would have one code the first time it is used, and a different code the second time it is used. The number n, which is the number of clock cycles between new sequencer codes is designed in coordination with the data output block size. If the data output block size is 1 byte, n is 1. If the data output block has 8 bytes, n may be up to 8. The intention is to obscure the relationship between an encrypted op-code and a result so that adversaries cannot simply feed chosen OP-codes and data to the CPU 11 and observe a simple relationship between them. With this plan, the adversary will observe that a block of output data has a complicated relationship with chosen data inputs and chosen long instruction words loaded into the instruction buffer. The CPU 11 will require that the instruction buffer be filled before any data results are output.

Complexity theory is used in the logic reconfiguration. Adversaries who try to observe the signals on the CPU 11 will encounter more variability than on ordinary ICs. Logic functions will be allocated depending on the key and on the sequencer 71. Each CPU 11 with a different key uses different metal lines and other conductors to use different logic gates for standard functions of a microprocessor.

A memory remapping capability will be implemented on the CPU 11 so that memory resources on the CPU 11, which have fixed locations on the silicon chip, will be allocated to be used for different program variables, depending on the key.

Instructions Longer than Minimum

As an example, each instruction may be 128 bits wide (16 bytes). Also suppose standard op-codes are one byte each. If only 9 encrypted op codes are put in the 16 byte instruction, this leaves 7 bytes for camouflage, error correcting codes, sequencer reset codes, and interdependency codes. A wire crossing will permute the 128 bits when the compiler creates the 128 bit instruction, and the CPU 11 with the right key will reverse this wire crossing before using op-codes for the instruction decoder. The op-codes are well-known in the art of microprocessors and are a form of an abbreviated instruction set. An example of op codes are shown in Appendix 5 (page 316) of Malvino, *Digital Computer Electronics*, second ed., 1983, ISBN 0-07-39901-8.

Figure 3:
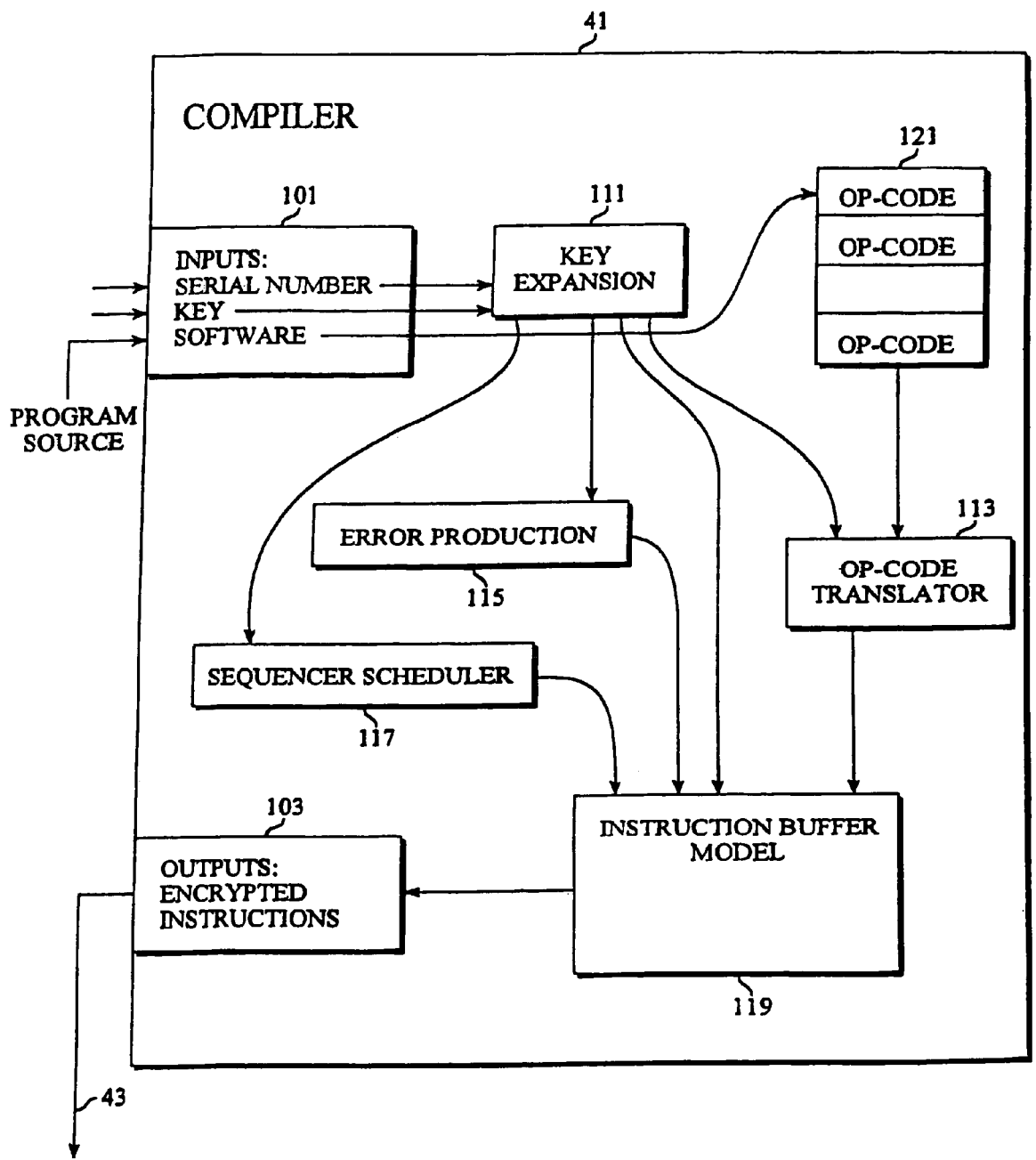
FIG. 3 is a diagram which shows an example of an implementation of the encryption done by the compiler according to the invention.
Figure 4:
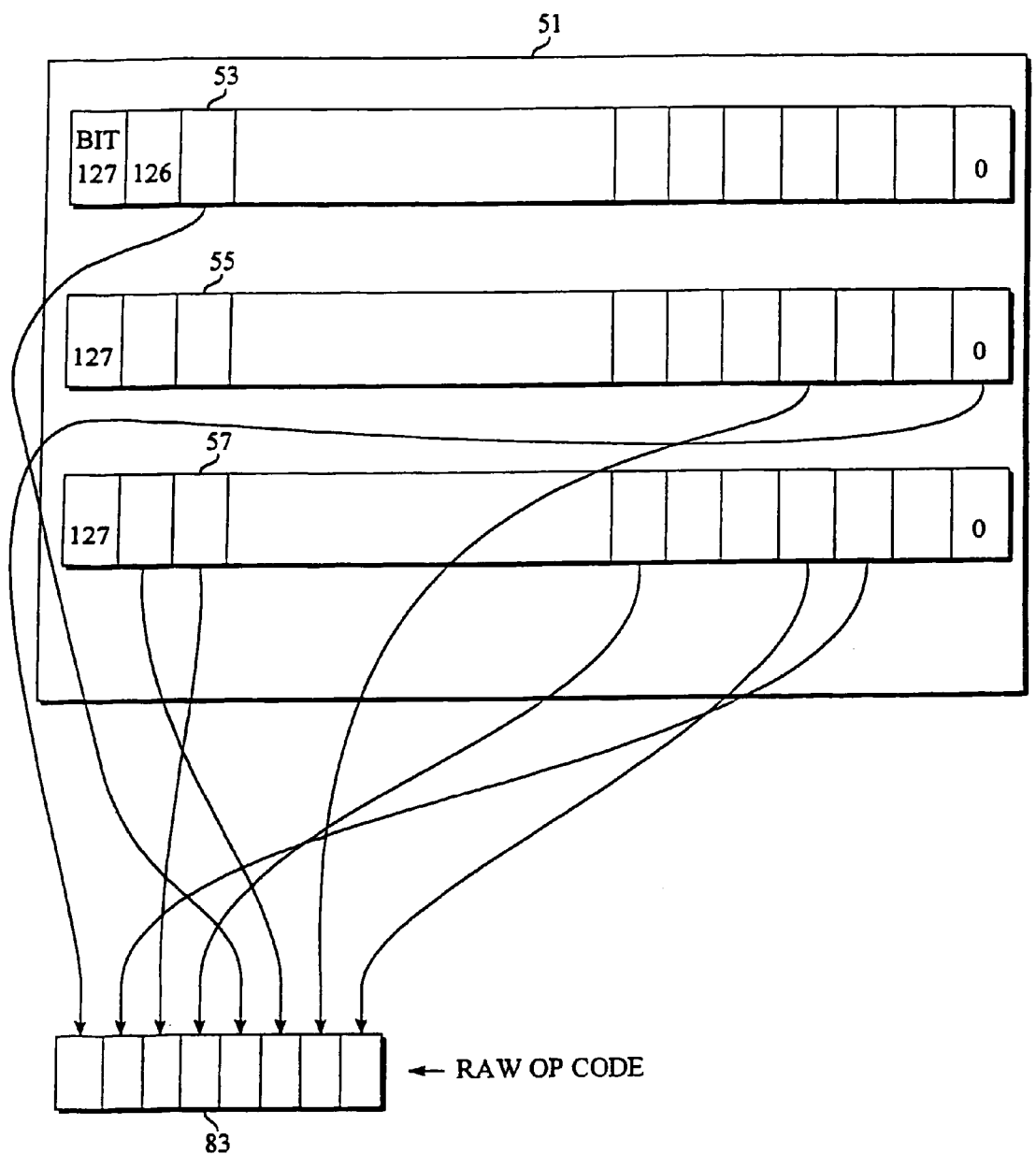
FIG. 4 is a diagram which shows the reverse wire crossing done by the CPU according to one embodiment of the invention.

FIG. 3 shows an example of an implementation of the encryption done by the compiler 41 and FIG. 4 shows the reverse wire crossing done by the CPU 11. Referring to FIG. 3, the compiler 41 receives information from a program source at an input circuit 101 an output encrypted instructions to the CPU at an output circuit 103. The output at 103 is encrypted for the particular CPU 11, as identified by a key provided by the software vendor and a serial number of the CPU, stored on the CPU 11 at 17 (FIG. 1). The key and the serial number are expanded at key expansion circuit 111. The key expansion circuit provides information to an op code translator 113, an error production circuit 115, a sequencer scheduler 117 and an instruction buffer model 119. Op codes are provided by software source code from the input 101 and translated into object code at an op code compiler 121. The compiled op code is translated by the op code translator 113 in accordance with the expanded key from the key expansion circuit 111. The translated op codes are then provided to the instruction buffer model 119. The instruction buffer model 119 performs wire crossings of bits to form encrypted instructions.

The error production circuit 115 inserts errors in an instruction set stored in the instruction buffer model. Since the CPU 11 includes an error correction circuit 79, it is possible to use the errors provided by the error production circuit to insert errors which are correctable in a predictable fashion. The error correction circuit 79 is then able perform error correction in a predictable fashion in accordance with error correction data supplied by error correction code circuit 77. The error production circuit 115 receives its control information from the key expansion circuit 111 and therefore the types of errors produced match those which can be anticipated to be corrected. Moreover, certain classes of errors can be safely inserted assuming a known error correction algorithm is being used. The successful correction of these errors can be presumed, but only if the known error correction algorithm is used. Therefore, the successful correction of intentionally inserted errors by the error correction circuit 79 can be assured.

The instruction buffer therefore provides output instructions which include translated op codes, the errors, the sequence scheduling information from the sequence scheduler 117, and key expansion information. This data is provided to the output circuit for providing encrypted compiled instructions along communication line 43.

In FIG. 4, long instruction words are used in the instruction buffer 51 of FIG. 2 which permit reverse wire crossing by the CPU 11. Each of the multiple instruction registers 53-57 includes more bits than are used to provide the op codes provided at instruction decoder 83. As represented in FIG. 4, the locations of bits within these instruction buffers is randomized according to the expanded key. The connections between the individual bits in the multiple buffers 53-57 is therefore random, as represented by the errors in FIG. 4. There are, however, no hard wire connections from specific bits in the multiple instruction buffers 53-57 to the instruction decoder 83; instead, the data from the registers 53-57 are provided to the instruction decoder 83 through the multiplexers 63-67 shown in FIG. 2.

Instruction Buffer Interdependencies

Figure 5:
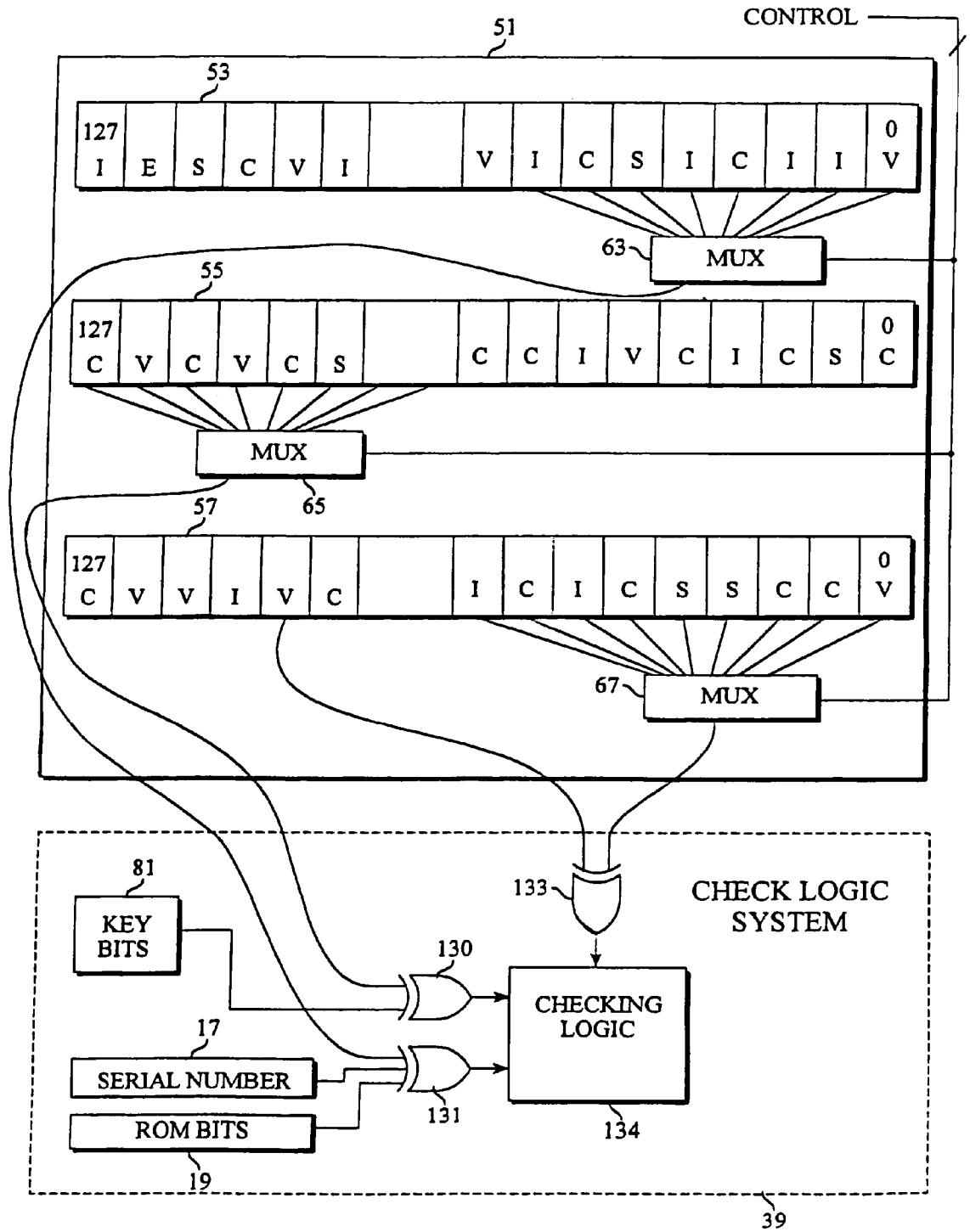
FIG. 5 is a diagram which shows how interdependencies between operations are checked in the instruction buffer.

Since the blocks of instructions are larger than they need to be, interdependencies between bits of separate instructions can be provided so that the CPU 11 may check these dependencies for conformance to criteria shared by the compiler 41 and the CPU 11. FIG. 5 shows how interdependencies are checked in the instruction buffer.

FIG. 5 is a block diagram of the instruction buffer 51 and a check logic system 39 according to the invention. The check logic system 39 provides an instruction interdependency check between data provided from the multiple registers 53-57. By combining key bits and serial number bits with selective outputs from the multiple registers 53-57 it is possible to provide a verification of the authenticity of information being transferred through the instruction buffer 51. Different bits stored within the multiple registers 53-57 may include instruction op code bits (represented by I), error correction code instructions (represented by E), sequencer reset codes (represented by S), and validate dependency bits (represented by V). In addition, since there are more bits within the multiple registers 53-57 than required for transferring operation instructions, it is possible to provide camouflage bits (represented by C), which make it increasingly difficult to resolve the stored bits of information from the shift registers to a decoding algorithm.

Fetches from external memory are in blocks of b words, where b is a number between 2 and 32, usually. Not all of the fetched bits are used. This causes confusion for adversaries who try to interpret the behavior of the chip from its pins, without observing internal signals. Some of the bits are there for camouflage so an adversary may waste time analyzing them. Some bits just separate useful bits so that adversaries cannot tell which bits should be combined to compose an op-code. One encrypted op-code may have bits in more than one 128 bit instruction in the instruction buffer.

Instruction block sizes are larger than a predetermined minimum size for performing computational functions of the CPU chip 11. Programs compiled to execute on the CPU 11 are compiled in a manner to utilize block allocations of instructions according to a key. Since the blocks of instructions are larger than they need to be, interdependencies between bits of separate instructions can be provided so that the CPU may check these dependencies for conformance to criteria shared by the compiler 41 and the CPU 11.

Logic Architecture that Comprehends Physical Implementation in a CPU

Figure 6:
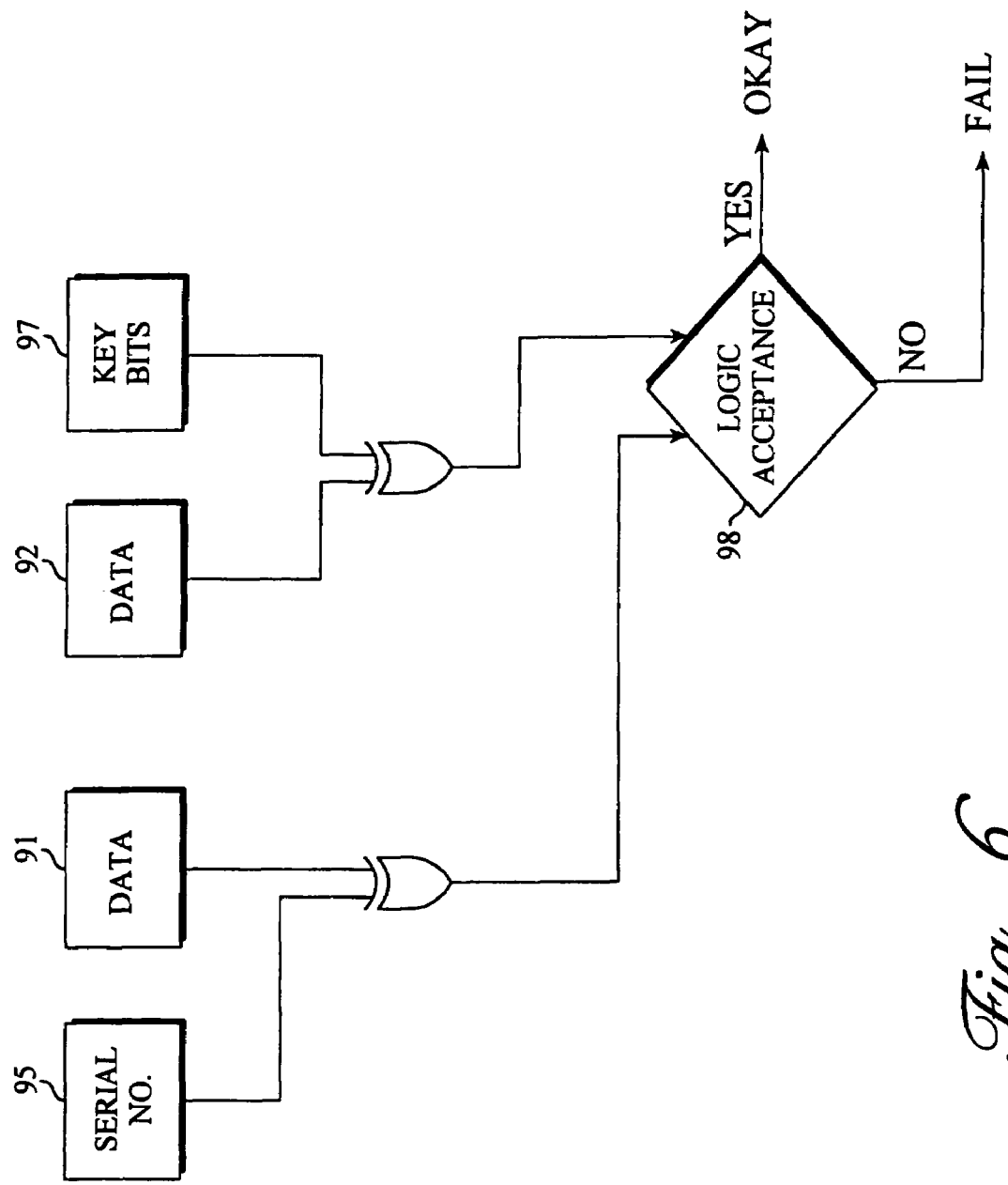
FIG. 6 is a logic diagram showing the interdependency checks.

Referring to FIG. 6, a prior art CPU 131 may include specific regions for random access memory (RAM) 133, read only memory (ROM) 135 and a non-volatile memory such as $E^2PROM$ memory 137. The purpose of thdifferent types of memory 133-137 may be varied, although RAM 133 is typically used for program manipulation, while ROM information 135 is used for fixed data. $E^2PROM$ is less easily manipulated because of the time it takes to write to $E^2PROM$, and is used for program action instructions and other data which is written to the CPU 131 at one time or occasional basis.

Figure 7:
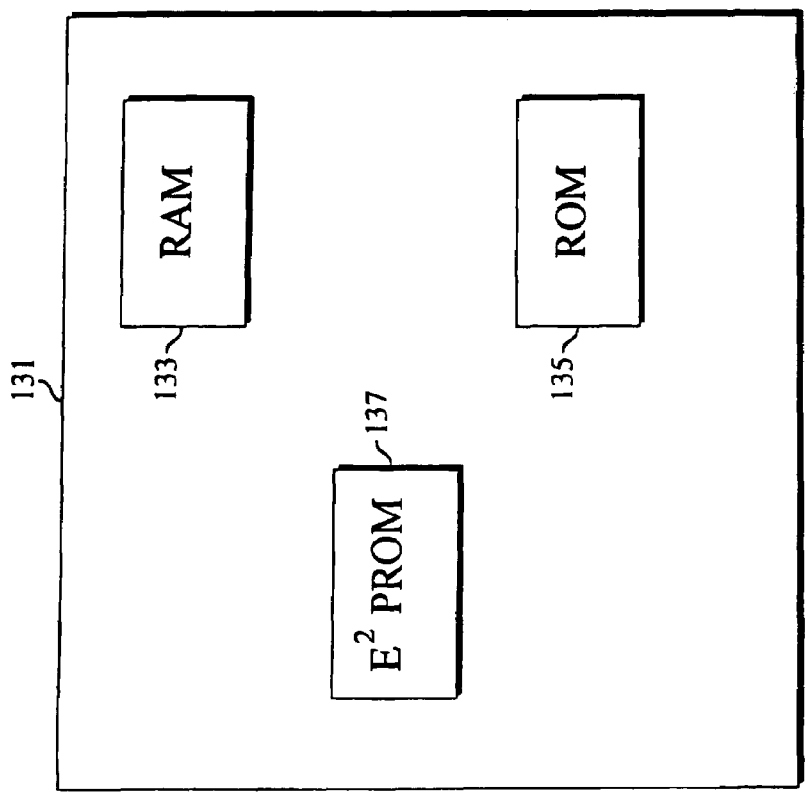
FIG. 7 (prior art) is a diagram which illustrates how memory placement on a typical microcontroller is implemented.

Referring to FIG. 7, each memory type used on the invention (RAM, $E^2PROM$, PROM, ROM, anti-fuse, fuse, laser-link) appears in several distributed block sizes in the physical layout, including for example 1 bit memory elements which are used in logic in a static way. According to the invention, there are hundreds of distributed single bit memory blocks used to comprise an entire memory unit. The CPU 141 can include a 16 bit block of memory used to control reconfigurable logic according to the invention and the memory can be in larger n bit arrays, as is normally seen on ICs. This tactic increases the complexity of the work that an adversary must perform. The distribution of memory on a CPU is such that the various forms of memory are widely distributed. Thus, various distributed segments of the CPU 141 are allocated for RAM 143 ROM 145 and $E^2PROM$ 147. This provides several advantages:

1. Multiple applications which use one CPU may have separate memory blocks. This provides more secure separation of information than if only one memory block were to be used to hold information for multiple applications.
2. In order to provide keyed information and instructions which are particular to a specific CPU 141, the instructions are written at multiple locations. Thus, the modified instructions for performing an operation under one particular variant of a program may require instructions changes at various stages within the CPU 141.
3. By locating memory used to reconfigure the CPU 141 at different locations, it becomes more difficult to analyze the CPU to determine which specific codes are provided to the CPU 141.

The configuration of the logic architecture is varied according to keys which are used to encrypt the software and to operate the deconvoluting operational logic of the CPU 11 according to the invention. Software compiled according to the keys is implemented so as to accommodate these changes. This allows variations in memory block size and layout, as well as variations in pipeline use. Since each CPU 11 could be provided with a different key, the software compiled according to one key would not work with a CPU varied according to a different key.

The keys are preferably programmable in non-volatile memory, such as $E^2PROM$ (erasable programmable read-only memory) cells on the chip. The IC can hold many keys and they can be erased and re-programmed many times. The chip manufacturer need not know any of the keys on the chip. The user has possession of the chip's security capabilities, and can decide whether to accept or reject conditions established by software licenses. In other words, the user can purchase a microprocessor chip with all keys in a blank state, and then optionally load keys or not load them.

Normally, the user will never need to load a secret key, but only public keys. The user also has the option of loading secret keys, instead of using the internal key generation procedure, described in the next paragraph. There is no function available to read keys out of the microprocessor chip after they have been stored in non-volatile memory, but an authorized user can erase all of the keys. The trustworthiness of the IC manufacturer is not provable, but it is a goal of this design to include no hardware on the IC that provides a back door for the manufacturer to use. Software can be loaded into the chip to perform secret functions that are not provided by any special hardware, but no software has the power to control all of the hardware.

The keys for the IC and the compiler 41 may be chosen at random and given to the compiler 41 and IC by secure means. However, the following description is one in which the IC creates the keys. The keys are generated by an on-chip random number generator and are kept temporarily in RAM. A public key for a software vendor is entered into the IC and the key is encrypted with that public key. This encrypted key is sent to the software vendor so that a purchased program can be compiled to produce instructions that will only be executable by the IC that created the key. The IC uses the key to produce the custom instruction decoder functions by programming non-volatile memory cells in the instruction decoder. The IC then expands the key into an "expanded key" and stores this expanded key in non-volatile memory cells around the IC. These bits of the expanded key control switching circuits, reconfigure logic, and in general, customize the IC to implement all of the security features described in more detail in the remainder of this text and figures.

The keys will be made partly from unalterable ROM, and partly from PROM which can be programmed. In addition, $E^2PROM$ memory which can me erased and rewritten can hold some of the key bits. By using more than one memory technology and more than one memory location to hold key bits, it makes it more difficult for an adversary to discover all of the bits of the key.

The inventive arrangement focuses on two levels of vulnerability for ICs: the pins on the IC package and the internal signals on the IC inside the package. According to this aspect of the invention, a microprocessor has its conductors allocated and its logic reconfigured into a scrambled arrangement, depending on a key. It can operate on ordinary data in ways that are so different from other copies of the IC, so that most adversaries are prevented from learning valuable information about the keys, about some ROM bits, and about the instructions. Those adversaries who do learn that information may often be prevented from profiting by that information by techniques that further vary the operation of individual CPUs. Additionally, the data operands and results, which are not encrypted, have their usefulness obscured to adversaries. Data encryption can also be used as a higher layer of protection.

This aspect of the invention uses a microprocessor that is being scrambled to process standard data. The architecture is designed with the physical layout in mind, but it does not depend on that level of detail. This architecture brings together the need of the end user with the planning of a microprocessor architecture, so that implementors have the framework of security upon which they can specify detailed implementations which comprehend past security attacks.

Instruction Result Obfuscation

It is possible for the CPU 11 to have its logic gates configured to perform variable logic instructions. The logic gates may be reconfigured according to a key. Even though the instructions may be coded to obscure their meanings, the instructions still specify ordinary operations such as AND, OR, ADD and COMPARE. So to make these operations more difficult for an adversary to recognize, measures will be taken. The logic gates which calculate the result of each basic operation will be variably allocated from several possible sets of logic gates. Also, the result of the basic operation will be made more obscure than is normally done. The operands that are used as inputs to the logic for the basic operations can be in two different formats, so an adversary has a difficult time understanding what is going on. This is a tactic called plausible wrong answers. In this plan, two correct operands and two plausible wrong operands are sent to ADD circuits. Two answers are calculated, a correct answer and a plausible wrong answer. These two results are then sent to separate other circuits for further buffering or manipulations. This bifurcation, when combined with large data output block size introduces some uncertainty into the analysis done by adversaries. Plausible wrong answers may be included in data output blocks, but would not be used by external devices which are compliant with this scheme.

Figure 8:
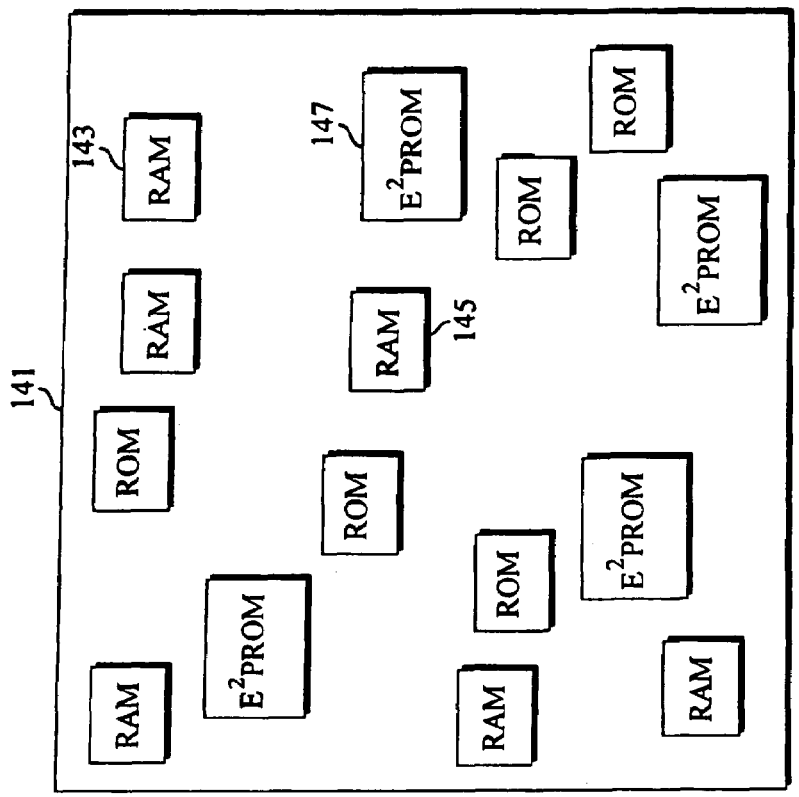
FIG. 8 is a diagram which illustrates how memory placement according to the present invention differs from ordinary microcontrollers.

Referring to FIG. 8, there is shown a diagram of CPU 11 comprising various ROM bits 141 including serial number information 143, and reconfigurable logic 145. The ROM bits 141 are distributed about the integrated circuit CPU 11 has the advantage that different controls for the CPU logic can be located at different locations. Thus, if a portion of the logic is reconfigurable, then the actual function of that logic can be more readily controlled by the ROM. In addition, it is possible to mix depletion mode and enhancement mode bits in ROM 141, so that a visual analysis of the CPU 11 does not reduce to a clear analysis of the status of various logic gates and bits.

Figure 9:
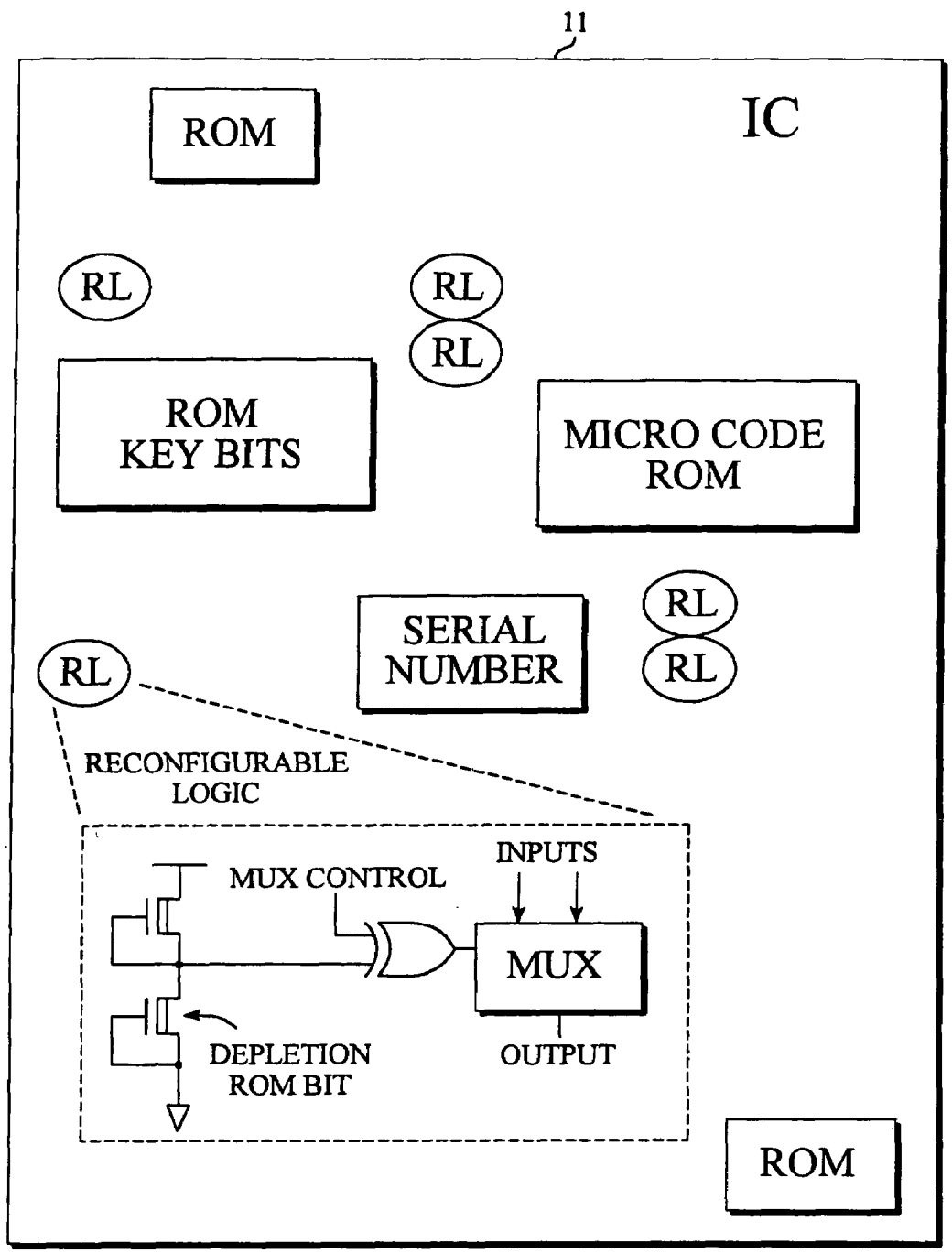
FIG. 9 is a diagram which illustrates where the ROM sections may be placed in a microprocessor system according to the invention.

FIG. 9 shows the logical operation of obfuscation of logic executed by the CPU and illustrates how instruction results are obfuscated. By the use of reconfigurable logic gates as described in connection with FIGS. 1-2, one is able to provide a combination of correct and incorrect answers for each logical operation. Thus, if an operation is defined as using operands A & B, multiple operands can be provided, thus resulting in correct answers, as well as incorrect answers. The purpose of this invention is to make it more difficult for an adversary to gain valuable information by observing signals on ICs. Since instructions are never decrypted into ordinary codes, this is an advancement over earlier chips that have adversaries.

The issue arises about recognizing instructions by the actions taken by the ALU pipeline in response to the non-standard instructions and data formats. For example, there may be an instruction called AND which takes two operands and calculates the bit wise ANDing result. So someone may expect it to be easy to recognize the instruction by its result. Therefore a technique proposed in this invention is to design logic which is difficult to interpret. In this example, the logic dedicated to the AND function would be configurable into a variety of forms depending on the key, so two different chips would usually have different logic gates allocated to perform the function. Also, a variety of result storage gates would be available to be allocated to hold the result of the ANDing of the operands, and the key would determine which gates are the ones which are used on a particular IC with a particular key.

This variability of logic gate allocation for instruction execution and result storage will make it more difficult for an adversary to understand the operations which take place. False result gates will be allocated to hold wrong results after the instruction is executed to baffle adversaries.

The two data operands can have different data formats (different numerical representations) and the ADD logic gates will take these differences into account to produce a correct answer. Similar techniques for SUB, MULT, etc. (standard instructions) will provide variable allocations of logic gates for different ICs depending on the key. This multiplicity of key-dependent logic implementations for standard logic and arithmetic operations will increase the die size but even more, it will increase the difficulties for adversaries to profit from signal observations.

The CPU 11 is provided in which its logic design is variable, and when a program is provided for use in the particular computer, the program is compiled in accordance with the architecture supplied by the microprocessor. Therefore the microprocessor has a variable instruction set, at least with respect to which functions are generated by which program sequences in object code.

The variability is established by and is supplied to the CPU 11 in memory stores established by E²PROM, ROM and RAM memory on the CPU 11. Thus, when a program is provided for use in the particular computer, the program is compiled in accordance with the architecture supplied by the CPU 11 as determined by the key. Therefore, the CPU 11 has a variable instruction set, at least with respect to which functions are generated by which program sequences in object code. The architecture of a particular chip may be established during the logic design of the chip, thereby defining the architecture for each CPU chip independently.

ROM Implementation

The ROM will hold a serial number, key fragments, customized switch bits, and ordinary microcode. Key fragments are about 8 bits of ROM that are appended to the rest of the key that is stored in programmable memory. Custom switch bits are ROM cells which control inputs to multiplexers and logic gates so that signal routing for logic gate allocation will be partially controlled by these bits. Microcode is commonly used on ordinary microprocessors for general purposes.

Wafer masking techniques usually use "reticles" which can have one or several IC images on each reticle; 4 to 16 ICs per reticle are common. This means that 16 ROM versions can be defined for each silicon wafer. All wafers from a fabrication run will have the same reticles. The 16 ROM versions can have 16 key fragments present, each 8 bits in size. These key fragments would be on the lowest planar level on the physical IC.

The key will not be limited to the lowest layers of the IC structure, as some of the ROM bits should be. Some low level ROM bits will control the allocation of some logic gates. The values of these secret ROM bits are directly mapped to the ROM serial number which is partially made public. So not every chip made according to the invention is the same, even disregarding the keys stored in E²PROM cells. If there are 16 versions on a wafer, then many wafers will share the same 16 ROM codes. ROM bits may be in arrays or in a single bit configuration so that they are scattered around the die to customize logic in ways that are revealed by the serial number. In this way there appears to be 16 different IC designs due to the reticle design mentioned earlier. FIG. 8 illustrates where the ROM sections may be placed on the IC.

Preferably depletion implant ROM processing will be used because this is known to be difficult to observe visually. A depletion device usually is an n-channel MOS transistor that has a negative threshold voltage. The purpose is to use two non-volatile memory technologies to store information which reallocates logic gates to form the CPU. By using depletion ROM as one of those technologies, some signals can remain only on the lowest planar conductor layers of the IC structure. This makes it more difficult for some adversaries to measure the states of the logic.

The invention makes use of reconfigurable logic pervasively. This reallocation of logic gates under control of the key bits and ROM bits is largely what makes this idea valuable. This makes it difficult for adversaries to profit from signal measurements.

Serial Number Utilization

Serial numbers are sometimes sent in public view, and keys are normally secret. Each chip will have a unique serial number which is partly stored in ROM and partly stored in E²PROM. The serial number is sent to the compiler 41 so that the ROM hardware customization bits will be specified. For example, if 16 ROM versions are produced, as previously described, then there will be 16 ways in which logic hardware will be allocated under control of the ROM codes. The serial numbers stored in ROM will also have 16 values coded in as little as 4 bits. This is one reason for having a serial number.

A second reason for having a serial number is to uniquely identify an IC without using cryptography.

A third way to use a serial number is to encrypt it using a public key and then sending it to the owner of the public key to be interpreted.

Optionally, this invention uses a new technique called the "partial serial number strategy." This strategy is to never show the whole serial number in public, but to only show part of it. The serial number may have 128 bits, for example. Which part of the serial number is shown is under control of some key bits. By using only a part of the serial number, hundreds of partial serial numbers can be derived from only 16 ROM serial numbers, without even using the programmable E²PROM sections of the serial numbers. The compiler owner has secured copies of the 16 whole serial numbers so the compiler owner can compare partial serial numbers with sections of whole serial numbers. When a match is found, the compiler owner knows which serial number the partial serial number came from. The serial number is needed for the compiler 41 to produce software which comprehends the state of the IC logic. Some parts of the ROM are not serial numbers but they are secret bits which allocate some logic gates. How these gates are allocated is under control of only the ROM, and these gates should only occupy the lowest layers of the IC structure.

The "partial serial number strategy" is intended to increase the complexity of the task facing adversaries who only observe information that is intentionally sent from a CPU chip. By using only a partial section of the serial number for each IC, hundreds of different CPU chips will send unique serial numbers based on only 16 ROM versions. Other sections of the serial numbers only will come from E²PROM cells, and so, they are unique to each IC. One example of how the key may select parts of the ROM serial number is to report the serial number after ignoring the first m bits of it, where m is a function of the key. Other ways may skip odd bits in the serial number and report only even bits, where that choice is determined as a function of the key (for example a cryptographic hash of the key).

Adversaries may record and replay serial number fragments which are not valid for their CPU ROM and key combination. If they are sent software, then it is likely that it would not be usable on their CPU chip.

Networked Interactions

The invention can be programmed to require a handshake with a server to allow continued operation, or it can be put in stand-alone mode. The key can be changed remotely and new data formats and new software may be needed to continue operating. Physical protection of the key is easier than physical protection of programs, but if a key is discovered by an adversary, networked handshaking can make that captured key useless. Various plans can be created to discover the existence of captured keys, and to deal with pirates in subtle ways, without their knowing they have been detected. While an old key can be programmed into the inventive IC to use an old program with old data, new programs and data formats for new keys will not be useful to pirates with old keys.

Figure 10:
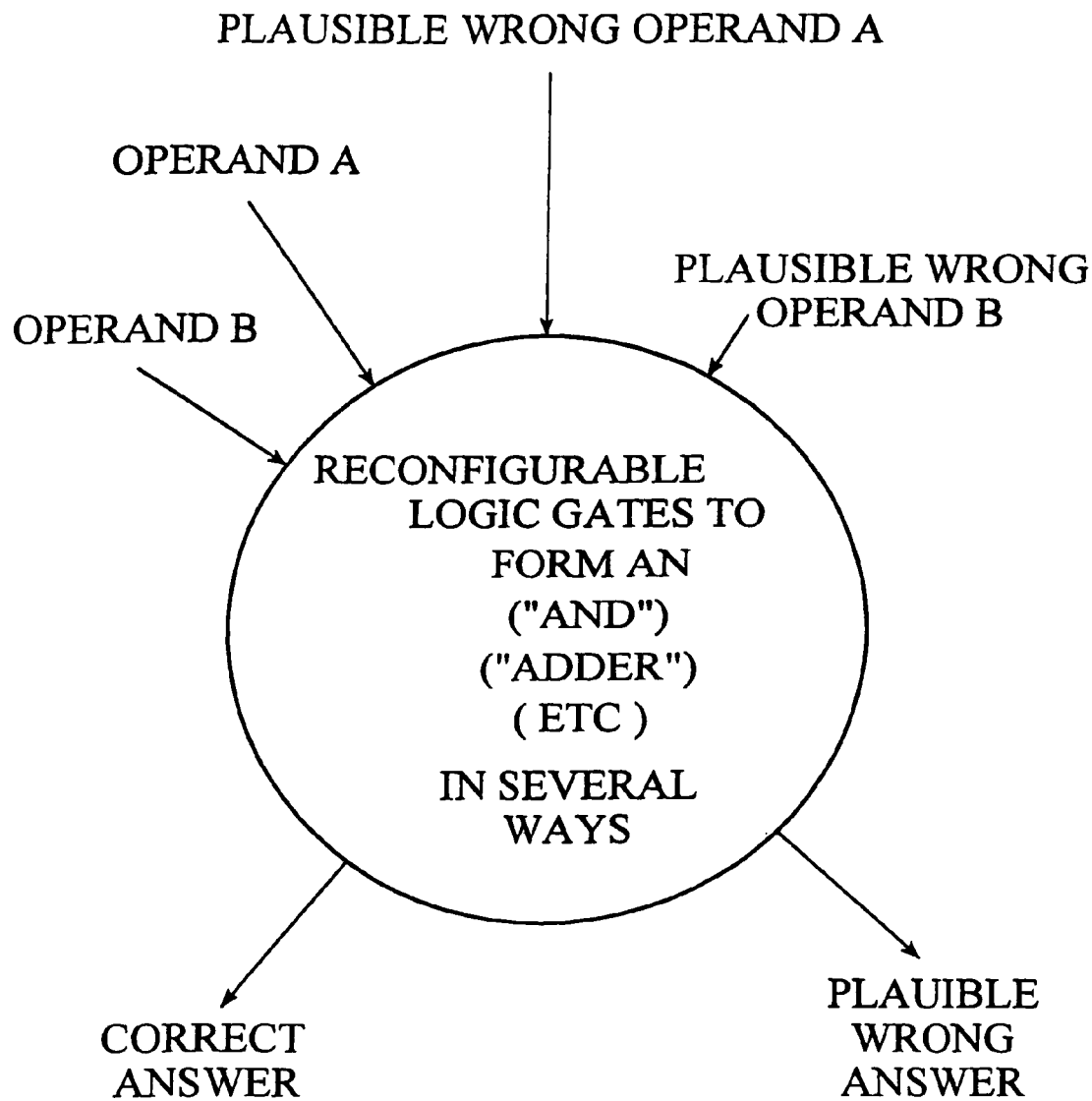
FIG. 10 is a diagram which illustrates how instruction results are obfuscated.

FIG. 10 is a diagram of CPU 11 showing the use of shows the use of satellite access flags distributed at various physical locations on the CPU 11 according to the invention. By placing various flags at different locations on the CPU, it is possible to provide a control function which is varied in accordance with the specific flag at that point.

Satellite Access Flags Made Complicated

Microprocessors and microcontrollers which are designed using the architectural features in this description may be used for satellite TV access electronics, smart cards, personal computers, workstations, and embedded secure appliances for many purposes. Satellite TV access controllers (set-top boxes) may especially benefit from this architecture.

According to the invention, security features would have different layers of implementation. One layer would allow multiple users to have the same security features. This would permit some mass-distributed programs to be distributed to multiple users without creating customized variations of the programs for each individual user. Thus, if, for example, a satellite broadcast were used to service large numbers of customers, that satellite broadcast could include a program which is functional on the computers owned by the large numbers of customers, without varying the program for each individual user. A second layer of protection customizes the hardware logic and memory allocation, as described previously, so that commonly distributed programs would be implemented in unique ways using common hardware.

FIG. 11 is a diagram of CPU 11 showing the use of shows the use of satellite access flags distributed at various physical locations on the CPU 11 according to the invention. By placing various flags at different locations on the CPU, it is possible to provide a control function which is varied in accordance with the specific flag at that point.

Protection schemes for set-top boxes have a history of being more easily broken than other types of cryptographic circuits. This is because the satellites must broadcast the same cryptographic keys to many set-top boxes simultaneously. Also, for fixed instruction set processors, it is easy to observe how the satellite key is used. The satellite key is stored in known locations on the chip and access approval flags are located in fixed locations. The inventive CPU 11 will reduce these vulnerabilities. The storage for satellite keys would be scattered in many locations on the chip with extra storage available to disguise the satellite key. The location of the satellite key would be different for each key and serial number, so a pirate has a more difficult task to observe a satellite key and to sell the satellite key.

After an authorized set-top box has completed cryptographic calculations to enable reception of the TV programming, an "access flag" may be set to the enabled state. The access approval flag has also been an easy target for pirates: one flag bit can be set with a light beam to give the same access that a cryptographic calculation would have provided. With the keyed allocation of hardware logic and memory which this invention provides, and a large number of flag circuits available, arrangements can be made to use varying flag bit locations of both polarities, ones and zeros. Then, some simple pirate flag setting techniques would become obsolete. FIG. 11 shows how multiple access flags may be placed on the IC.

In the case of multiple access flags, the multiple access flags are scattered around the chip in different locations. The access flags are also given different polarities so that some of the bits will be 0's and some of the bits will be 1's to allow access. The precise arrangement of which bits are enabled with 1 and which with a 0 is determined by program instructions, including the variable instructions that are being executed. As a result, each chip is different in the way it is operated. Eve h though the physical layout of the chip is the same, as a result of the variable keys and access flags, the actual bit states (1's and 0's) being represented at given portions of the chip will be different for each chip when it is in operation.

This scattering of key bits and access flags is useful in preventing adversaries from either understanding or duplicating the results of program code execution. Therefore, even though the software source code itself may be one program, the hardware on the IC which uses this common program would be allocated differently under control of some key bits. To do this, keys are expanded into a set of expanded key bits, as previously described. Some of these expanded key bits control instruction decoder operations and some do not. For satellite TV applications in which common software is distributed to many inventive ICs, the expanded keys would provide a common instruction decoding logic while providing an uncommon memory and logic allocation. Thus, the key has two separate functions which must be coded into the key when it is produced.

Instructions Versus Data

Data and instructions are two different categories of information and this invention is designed to use encrypted instructions regardless of the data format. It is emphasized that instruction encryption is the primary purpose of this invention, a second purpose is to scramble on-chip logic, memory, and signal allocations, and that data is either unprotected, or given some small protection which does not involve data encryption. This invention is not about data that is being scrambled by a standard microprocessor, it is about a microprocessor that is being scrambled to process standard data.

On the chip, there will be RAM for data and RAM for instructions. Some of the bits in those memories will be there to obfuscate the code, thereby confusing attackers. For example, if two numbers are added, the two operands can have extra bits that are not used. The result of addition in the arithmetic logical unit (ALU) can have extra bits of erroneous information that are stored into the data RAM. This randomizes results within the processor so the attacker may not be able to deduce whether addition occurred, or if the operation was subtraction, or EX-OR or other possibilities. In addition, the data memory mapping would become different for different chips.

There is an option to use a standard instruction set for an ordinary computer language with non-standard data representations. This provides an ability to perform mixed operation, in which standard op-codes are combined with variable data representations. Therefore there are four ways to operate: first, with standard instructions and standard data formats; second, with encrypted instructions and standard data formats; third, with standard instructions and non-standard data numeric representations; and fourth, with encrypted instructions and non-standard data numeric representations.

Dynamically Varying Data Representation

According to a further aspect of the invention, dynamically varying representation is used for data processed in a CPU. The dynamically varying representation is still usable in arithmetic and logical operations without being decrypted. There are many ways to represent numbers, and the inventive CPU hardware design will have apparatus to operate on these multifarious representations, in coordination with the compiler 41. The compiler 41 creates a schedule for varying the numeric data representations, and the chip follows this schedule to use the data correctly. Examples of the proposed numeric representations are:

1. Data represented in Residue Number Systems can use the Chinese Remainder Theorem to provide calculations which some adversaries will find difficult to understand. For example, a number can be broken down into three parts under three secret moduli. The key would hold information on the three moduli, without which, the number cannot be easily re-assembled.
2. Radix conversions
3. Redundant Number Systems When results are written to external memory, they are written in blocks of w bytes, where w is from 1 to 32 usually. Not all of the results in this block are correct or useful results. Some results are correct results for a wrong operation to give an adversary the appearance of a behavior which is not the behavior which is used in the program. This will increase the difficulty of the task of an adversary who seeks to understand relationships between instructions, operands, and results. For example, if two input data operands are added, the data output block can contain both the sum and the difference so an adversary may not know what instruction was used to produce the answer. The key would determine the location of the correct answer. The destination for the output data block would need to have some coordination to determine which parts of the output data block are correct.

Pipelined Architectural Implementation

Some microprocessors use pipelining of the arithmetic logical unit (ALU) to obtain better performance. In this example, which uses a pipeline with 6 stages, it will be demonstrated how to implement some of the features of this invention into a pipelined architecture.

Each stage of the pipeline will contribute to the techniques which make the inventive CPU useful. The 6 stages are labelled: fetch, decode, register, execute, cache, writeback. Also, the Instruction Cache has a line size of. 128 bits, which is the same as the instruction size of the preferred embodiment.

In the Fetch stage of the pipeline, the instruction buffer holds four entries and the compiler 41 can use this buffer arrangement to provide interdependencies between instructions in groups of four to increase the complexity for any attacks that may be attempted. Bits of instructions in the instruction buffer are set to cross-check each other in a manner similar to parity checking. At this stage of the pipeline, hardware can check different bits in several instructions to verify the validity.

The Decode Stage of the pipeline usually allows instruction folding, but this can be changed to allow instruction buffer dependency checking, to compose error correcting codes from the key and instructions, and to re-arrange bit substrings in the wide instructions to make decoding more efficient and to display camouflaging behaviour to any unauthorized observers. Errors in the instructions will be corrected at this stage. In addition, it is possible to include camouflaged bits in the instructions. The camouflaged bits may then either be stripped, or checked by separate circuitry in order to determine the existence of the camouflaged bits.

The Register stage of the pipeline will be involved with using the variable numeric representations. Type checking of data will important to using the correct arithmetic operations on the operands involved. This stage will also perform error correction on data.

The Execute stage of the pipeline may involve Object Field manipulation. Object Fields can have data that is scrambled before they are presented to the CPU chip. During the Execute stage, data can be unscrambled before being operated upon arithmetically. This makes the data less usable outside of the setting of the inventive CPU.

The Cache stage of the pipeline writes audit information to a security cache which is not normally visible to unauthorized users. Also, there is one extra register that is visible to users, and which can have various uses, such as a watchdog timer, which the program is required to write during the cache stage. At the security cache, any discrepancies which may have occurred earlier are noted, an audit may be performed, and flag bits set. At this point, it is not necessary to notify the user because the user may or may not be an authorized user of the software.

The Writeback stage of the pipeline may initiate a server handshake. At that point, information regarding security flags may be transmitted back to the server.

In the inventive CPU, instruction op codes are provided in such a pipeline architecture, and an information key is established. The information key provides instruction security commands in the multiple steps of the pipeline architecture, and an arithmetic logic unit (ALU, part of the logic 13 shown in FIG. 1) provides variability of logic circuitry for program execution. The execution can be performed using encrypted op codes or using standard op codes that provide standard instruction operation types.

Compiler Interactions

The compiler 41 will be designed to comprehend all aspects of the CPU 11 implementation of the architecture described for this invention. The key that is shared with the compiler 41 and the CPU 11 determines operating characteristics of the program counter, sequencer, wire crossings for the instruction buffer, interdependencies in the instruction buffer, error correcting plans, data representations, instruction encryption, output block size, memory allocation, secure memory partitioning, and all other details needed to use functions on the CPU 11.

There is more than one way to implement the invention, so more than one compiler type may be needed. In particular, the key can have two section: one for controlling instruction encryption and execution, and another for controlling unrelated hardware reconfigurability. In other words, the compiler 41 must be able to use a key so that a single encrypted instruction stream is available to many ICs which have different physical memory allocations, different result obfuscation circuit allocations, and various other reconfigurable logic resources which do not interfere with the execution of a common encrypted instruction program used on many ICs. Then the invention would be able to thwart power analysis techniques that seek to discover the key. Each time a smart card cryptographic key is used in a transaction, logic could be re-allocated so that power use would change.

Key Management

Key distribution could be handled securely by a variety of means. In a preferred embodiment, each chip has a public serial number. A second number, the key, could be provided by a Random Number Generator (RNG) on the CPU 11. The RNG may use the principles described in U.S. Pat. No. 4,694,412 "Random Number Generator for Use in an Authenticated Read-Only Memory", to Alan Folmsbee. This RNG uses several oscillators with capacitive feedback from the random number to alter their frequencies. This RNG also has small local heaters that turn on and off at irregular intervals to provide unique thermal histories for each session of key generation. Thermal noise and radioactive decay also provide randomness. A key is generated by this RNG and it is stored in non-volatile memory. The RNG may also create more serial number bits to be stored in programmable memory. In this way a user can customize the serial number, for added flexibility.

The public key of the software company is loaded into the microprocessor chip as used in this invention. The key is encrypted with that public key. The encrypted key and the serial number are sent to the software company. The software company decrypts the encrypted key with its private key and examines it to determine if it has acceptable statistical properties. If it passes those tests, the software company uses that key to encrypt the purchased software with the algorithm that the invention requires. The software company sends the encrypted software to the customer. That software will only be executable on one microprocessor chip; that is, the one that generated the random key.

The CPU 11 can have a large number of keys stored in $E^2$PROM cells so that software may be executed. The software may therefore execute instructions from many sources using different keys. Each key is comprised of multiple bits which alter the instruction decoders, obfuscation circuits, and the arithmetic logic unit (ALU). The software is not decrypted before execution, but selected software bits will be routed by "keyed wiring" to supply the correct instruction, data, and address bits to the correct circuit blocks.

There would be a facility for the software to alter its own key under certain circumstances. For example, the software license may require monthly payments to be made. If the payments are not made, the software can alter the internal key. To accomplish this, a permission code may be required to be downloaded from the Internet before the program is run a predetermined number of times. The chip sends an audit code to the software company and then the permission code is sent from the software company which is a customized number for each microprocessor chip for one program. The intent is that the customized number permits the software to be used by one user. The chip may give warnings about impending key modification, so the user has plenty of time to get the permission code. While the program is running, a real-time-clock emulation program can keep clock time so that it can tell when a time period has expired since the program was started. That is in addition to the limit of times the program can run without a new permission code. A clock frequency detection circuit can detect whether the clock is stopped or slowed too much.

Another circumstance may cause the software to erase its own key; that is if the chip is being tampered with. The microprocessor chip as used in this invention can have light detectors or e-beam detectors that set off the alarm. It could detect the presence of probe capacitances, broken metal lines, and irregularities in bond-pad inductances. A silent alarm might cause a prompt to appear, for the user to send another code to the software manufacturer in the manner used for monthly billing audits. In essence, it is a silent alarm. The software company can then respond with something other than the usual permission code.

Key bits and access flags may be placed in certain locations on a semiconductor die. A memory array of $E^2$PROM cells are used to hold the key bit. Numerous small arrays of $E^2$PROM cells are scattered around the chip at different locations. These bits are then used to store keys which will be on different physical locations on the die. Since the key bits are not always the same, each processor would be different. This means that the processor uses a variable instruction set, and different hardware on each individual chip will be activated upon execution of the instructions. If address mapping is scrambled in a variable way, each chip executing this same logarithm will be activated in a different way as a result of the hardware on the chip being activated in a different way. Protecting a key is easier than protecting larger information sets.

There are two common situations which deserve some explanation:
1. The chip is in an embedded environment in which all instructions are under one key, such as a smart card or set-top box for satellite TV. A tiny Card Operating System in this case would be coded for the key and would be held on the chip.
2. The chip is in an open system such as a PC or workstation where an Operating System (OS) is not using a key.

The first situation is the easiest to deal with. This will be where the CPU 11 is dedicated to one embedded situation where it uses one key for a long time. It can have its key changed by re-programming $E^2$PROM cells. Then it uses the new key for a long time.

The second situation can use a null key (all zeros) where the OS uses ordinary op-codes for its work, and then the secret key bits are used for the variable instruction set for non-OS tasks. On-chip memory is partitioned so there is a section which the OS cannot access because it is only used for programs running under the key. When implemented for this scenario, the $E^2$PROM cells holding the key bits are implemented as Non-Volatile RAM cells (NVRAM) where a default key bit is stored in the $E^2$PROM cell section of the NVRAM cell, and a variable key bit may be written into the RAM section of the NVRAM cell. This RAM section may be all zeros, so it uses standard op-codes such as Java byte codes, or it can be a volatile key so that the chip will use non-standard instructions from a coded OS.

There can be two programs interleaved (or more than two if the added expense of IC real estate is provided to allow several keys to be ready for use at any time). One program can use the default key in the NVRAM cells and then, with little delay, the key bit value in the RAM part of the NVRAM cells can become the controlling key bits.

When one key is in effect, the logic gates are allocated to form a microprocessor under that key's command. When another key is put in effect, the instruction decoder is re-programmed to respond to the other instruction set. For this purpose, where switching instruction sets occurs frequently, the instruction decoder should be controlled by volatile RAM cells so that the endurance is not limited by $E^2$PROM cell endurance.

One configuration which may be useful in that scenario is the null-key configuration, with which standard op-codes are used for standard OS or other purposes. No security is lost when switching to a null-key because the on-chip memory is partitioned to prevent the OS from reading memory locations that are provided exclusively for the secret key. The coded software under the key is not usable by the OS, so that does not need to be protected. Off chip memory is not protected, and the program must be written to recognize this fact.

When the switch is made from one key to another key, the state of the processor is saved to secure on chip memory locations so that the state can be restored when the first key again comes into effect.

The CPU 11 uses the programmable instruction decoder to decode encrypted instruction op codes. The decoding is accomplished without decrypting the op codes and logic gates immediately process data. The data representation changes during the execution, which has the effect of securing the program from analysis for decryption.

A custom instruction set is provided for each CPU chip 11 or groups of CPU chips. That custom instruction set would be used by the software manufacturer to send a unique version of a mass produced program to a customer with a microprocessor chip. The CPU is therefore programmed for that custom instruction set. The length of each instruction, and the other features of this invention should be configured to have cryptographically significant security when viewed from the IC pins. Pirates who examine signals inside the IC will be deterred from success by the encryption techniques. A secret key is used by the IC and by the compiler 41 so that the instructions produced by the compiler 41 are only executable by an IC which has the same key. The key is stored on the IC in non-volatile memory and it controls the instruction decoder, reconfigurable logic, signal routing, error corrections to instructions, a sequencer circuit, and instruction buffer content interdependency checking. The key also determines the program counter operations which would not be incremented in the usual manner. The key also controls instruction result obfuscation circuits so that common microprocessor results, such as the ANDing of two operands, are not easily recognized. The key controls memory mapping in the IC so that physically fixed memory resources are allocated in different ways for ICs with different keys.

Optionally, data may be used in various numeric representations which do not constitute encryption. These data representations would be of varieties which can be immediately evaluated by logic circuits. The data resulting from program-execution would be output from the IC in blocks which are larger than usual block sizes so that adversaries would have more difficulty in benefitting from knowledge of the data results. Data coding is of secondary importance in this invention, while instruction coding is of primary importance. The varying data numeric representations are not expected to provide much security from highly skilled experts, but they are expected to prevent unskilled adversaries from understanding the data. This technique raises a barrier against some adversaries, without using data encryption. The compiler 41 will be notified, by means of the key distribution information, of the variable data numeric representations so that it will compile instructions and data which conform to the data representations which the IC is prepared to handle.

The way instructions are executed, an adversary attempting to pirate the software will have difficulty understanding the results of instruction execution needed to reconstruct the algorithm that the program implements. It is a goal of this design to anticipate what pirates will try, and to provide measures which will thwart those expected, tactics. The microprocessor chip as used in this invention will have instructions, data, and addresses, as most computers do. The RAM for instructions will also have bits in each instruction that cause confusion for attackers, but which are ignored by the instruction decoder.

In the past, secured embedded microcontrollers have usually used standard microprocessor architectures and have attached security enhancing hardware around this core. In the inventive configuration, the architecture is designed with physical security in mind so that security hardware features are deeply embedded in the architecture, instead of around the periphery of the architecture.

One example of this plan is the way memory is used. Each memory type used on the invention (RAM, $E^2$PROM, PROM, ROM, anti-fuse, fuse, laser-link) appears in several block sizes in the physical layout. There is 1 bit memory which is used in logic in a static way. There should be hundreds of single bit memory blocks. There can be a 16 bit block of memory that is used to control reconfigurable logic. There can be larger n bit arrays, as is normally seen on ICs. This tactic increases the complexity of the work that an adversary may attempt.

The execution of encrypted software is accomplished by modifying instruction sets in a CPU, thereby obviating the necessity for decrypting encrypted software external of the CPU. As a result, there is no decrypted output of the software external of the CPU. By sufficiently protecting the CPU from analysis during its operation, an attacker is denied access to a decrypted form of the software and is further denied access to information with which to decrypt the software.

A physical design for the CPU 11 can be done with multiple layers of metal and with diffused conductors, so that e-beam analysis is more difficult. Conductors used in executing the encrypted code would be formed in this manner. As is well known to people who practice the art of IC voltage-contrast imaging, it is usually necessary to have a stockpile of many ICs to etch back, cut apart, and to probe so that ICs that are destroyed can be thrown away and be replaced by an identical IC. If each IC has uniquely programmed instruction sets, uniquely programmed address decoders, and uniquely programmed obfuscator circuits, then the pirate only gets one chance with one IC. If the pirate destroys one IC, she cannot get an identical IC to continue her work. She would have to start over again. Multiple layers of metal can be used to cover up lower levels of metal. In addition, p or n type silicon diffused conductors can be used to hide signals below higher levels of interconnect.

It is further possible to implement the invention with a coprocessor in a system with an ordinary CPU. The output of the inventive CPU is then provided to the user's computer. In one variation of the invention, the inventive CPU would be provided with multiple keys, including a fixed key, and keys which are changed at different periodic rates, such as yearly, monthly and at lesser time periods. While providing individual keys for individual CPUs, the ability of an adversary attempting to decrypt the software is limited to the ability to use that particular program on the particular CPU, without an ability to use the encrypted program on a different CPU.

It should be understood that various modifications within the scope of the invention can be made by one of ordinary skill in the art without departing from the spirit thereof, therefore it is intended that the invention be defined by the scope of the appended claims as broadly as the prior art will permit, and in view of the specification if need be.

What is claimed is:

1. A particularly configurable microprocessor for processing computer programs which are selectively operable on said particularly configurable microprocessor, comprising:

an instruction buffer for receiving instructions; destination logic circuitry for evaluating whether predetermined bits in the instruction buffer conform to predetermined criteria;

logic circuitry able to route a subset of instruction bits from selected bit locations in the buffer to the destination logic circuitry; and a programmable instruction decoder controlling the predetermined criteria to which the predetermined bits in the instruction buffer conform.

2. The microprocessor of claim 1, wherein:

the logic circuitry includes reconfigurable logic gates, said reconfigurable logic gates calculating the results of execution of an instruction;

the logic gates calculate the results of the execution of an instruction and make provisions for accepting correct data operands and plausible wrong data operands; and the logic gates calculate the results of the execution of an instruction and make provisions for outputting correct results along with plausible wrong results.

3. The microprocessor of claim 2, wherein:

at least a portion of the reconfigurable logic gates calculate the results of the execution of an instruction;

said portion of the logic gates includes provisions for accepting correct data operands and plausible wrong data operands; and said portion of the logic gates includes provisions for outputting correct results along with plausible wrong results.

4. The microprocessor of claim 1, further comprising:

program instructions provided in a pipeline architecture; and a capability of storing an information key established as instruction security commands at a plurality of steps in said pipeline architecture, wherein an arithmetic logic unit (ALU) provides variability of logic circuitry for execution of encrypted instruction op codes or standard instruction op codes that provide standard instruction operation types.

5. The microprocessor of claim 1, wherein the a choice is provided of using encrypted instructions or standard instructions.

6. The microprocessor of claim 1, further comprising:

logic gates configured to process data coded in various numeric representations and the logic gates able to accept results of the instruction execution using various numeric representations;

logic gates configured to immediately process said coded data; and the data representation able to change several times during the execution of a program so that numeric encodings of input data operands and output data results can vary.

7. The microprocessor of claim 1, wherein the logic circuitry includes reconfigurable logic gates, said reconfigurable logic gates make provisions for outputting correct results along with plausible wrong results.

8. A microprocessor for processing computer programs which are selectively operable on selected ones of individual microprocessors, comprising:

at least one memory location for receiving logic instructions for executing encrypted program instructions;

logic circuitry for modifying operation in accordance with the logic instructions stored in said memory location;

logic circuitry configurable in accordance with the received logic instructions, said logic circuitry routing a subset of the instruction bits from bit locations in the buffer to a destination logic block; and the logic block checking an instruction buffer interdependency responsive to said routing of the instruction bits;

wherein the logic circuitry includes reconfigurable logic gates, and makes provisions for outputting correct results along with plausible wrong results.

9. The microprocessor of claim 8, wherein:

the logic circuitry includes reconfigurable logic gates, said reconfigurable logic gates calculating the results of execution of an instruction;

the logic gates calculate the results of the execution of an instruction and makes provisions for accepting correct data operands and plausible wrong data operands; and the logic gates calculate the results of the execution of an instruction include provisions for outputting correct results along with plausible wrong results.

10. The microprocessor of claim 9, wherein:

at least a portion of the reconfigurable logic gates calculate the results of the execution of an instruction;

said portion of the logic gates includes provisions for accepting correct data operands and plausible wrong data operands; and said portion of the logic gates includes provisions for outputting correct results along with plausible wrong results.

11. The microprocessor of claim 8, wherein a choice is provided of using encrypted instructions or standard instructions.

12. The microprocessor of claim 8, further comprising:

logic gates configured to process data coded in various numeric representations and the logic gates able to accept results of the instruction execution using various numeric representations;

logic gates configured to immediately process said coded data; and the data representation able to change several times during the execution of a program so that numeric encodings of input data operands and output data results can vary.

13. The microprocessor of claim 8, further comprising:

program instructions provided in a pipeline architecture; and a capability of storing information keys as instruction security commands at a plurality of steps in said pipeline architecture, wherein an arithmetic logic unit (ALU) provides variability of the logic circuitry for execution of encrypted instruction op codes or standard instruction op codes that provide standard instruction operation types.

14. A particularly configurable microprocessor for processing computer programs which are selectively operable on said particularly configurable microprocessor, comprising:

a store for key shared with a compiler, the key used by the compiler to encrypt standard instructions into encrypted instructions;

an instruction buffer which contains logic circuitry for routing a subset of the instruction bits from bit locations in the buffer to destination logic circuitry; and an instruction buffer interdependency checking logic block responsive to said routing of the instruction bits.

15. The microprocessor of claim 14, wherein:

the logic circuitry includes reconfigurable logic gates, said reconfigurable logic gates calculating the results of execution of an instruction;

the logic gates calculate the results of the execution of an instruction and makes provisions for accepting correct data operands and plausible wrong data operands; and the logic gates calculate the results of the execution of an instruction include provisions for outputting correct results along with plausible wrong results.

16. The microprocessor of claim 15, wherein:

at least a portion of the reconfigurable logic gates calculate the results of the execution of an instruction;

said portion of the logic gates includes provisions for accepting correct data operands and plausible wrong data operands; and said portion of the logic gates includes provisions for outputting correct results along with plausible wrong results.

17. The microprocessor of claim 14, further comprising:
the key stored in more than one memory cell type including a Read Only Memory (ROM), an Electrically Erasable Programmable Read Only Memory (E$^2$PROM), and a Random Access Memory (RAM);
the key including bits expandable into a larger set of bits which control the instruction decoder, signal routing, and logic gate reconfiguration;
a serial number in ROM which participates in the allocation of logic gates and routing of signals, and communicated to the compiler to inform the compiler of custom allocation and routing; and
the key providing a capability of controlling signal routing, and logic gate reconfiguration whether the instructions are encrypted instructions or standard instructions.

18. The microprocessor of claim 14, further comprising an output register for data results able to contain both correct results and plausible wrong results, the results in word locations in the output register coordinated by the key.

19. The microprocessor of claim 14, further comprising:
program instructions provided in a pipeline architecture; and
an information key established as instruction security commands at a plurality of steps in said pipeline architecture, wherein an arithmetic logic unit (ALU) provides variability of logic circuitry for execution of encrypted instruction op codes or standard instruction op codes that provide standard instruction operation types.

20. The microprocessor of claim 19, further comprising:
the key stored in more than one memory cell type including a Read Only Memory (ROM), an Electrically Erasable Programmable Read Only Memory (E$^2$PROM), and a Random Access Memory (RAM);
the keys including bits expandable into a larger set of bits which control the instruction decoder, signal routing, and logic gate reconfiguration;
a serial number in ROM which participates in the allocation of logic gates and routing of signals, and communicated to the compiler to inform the compiler of custom allocation and routing; and
the key providing a capability of controlling signal routing, and logic gate reconfiguration whether the instructions are encrypted instructions or standard instructions.

21. The microprocessor of claim 20, further comprising an output register for data results able to contain both correct results and plausible wrong results which are in word locations in the output register coordinated by the key.

22. The microprocessor of claim 21, wherein:
a plurality of reconfigurable logic gates calculate results of execution of an instruction;
said plurality of the logic gates includes provisions for accepting correct data operands and plausible wrong data operands; and
said plurality of the logic gates includes provisions for outputting correct results along with plausible wrong results.

23. The microprocessor of claim 22, wherein the output register for data results contain both correct results and plausible wrong results which are in word locations in the output register, the locations of the results coordinated by the key.

24. The microprocessor of claim 23, further comprising:
a plurality of the memory locations dispersed-within a layout;
a plurality of reconfigurable logic gates able to calculate results of execution of an instruction;
said plurality of the logic gates including provisions for accepting correct data operands and plausible wrong data operands; and
said plurality of the logic gates including provisions for outputting correct results along with plausible wrong results.

25. The microprocessor of claim 24, further comprising:
the key providing a capability of re-allocating memory resources and register resources;
a serial number in ROM which participates in the allocation of logic gates and routing of signals; and
the serial number used in combination with the key in providing said capability.

26. The microprocessor of claim 14, wherein:
the key includes the error correction key, and including instruction key information shared with a compiler, the instruction key information used by the compiler to encrypt standard instructions into encrypted instructions; and
the key and the encrypted instructions coordinate variations of data numeric representations.

27. The microprocessor of claim 14, wherein a choice is provided of using encrypted instructions or standard instructions.

28. The microprocessor of claim 14, further comprising:
logic gates configured to process data coded in various numeric representations and the logic gates able to accept results of the instruction execution using various numeric representations;
logic gates configured to immediately process said coded data; and
the data representation able to change several times during the execution of a program so that numeric encodings of input data operands and output data results can vary.

29. The microprocessor of claim 14, further comprising:
program instructions provided in a pipeline architecture; and
information keys established as instruction security commands at a plurality of steps in said pipeline architecture, wherein an arithmetic logic unit (ALU) provides variability of logic circuitry for execution of encrypted instruction op codes or standard instruction op codes that provide standard instruction operation types.

30. The microprocessor of claim 14, wherein the logic circuitry includes reconfigurable logic gates, said reconfigurable logic gates makeing provisions for outputting correct results along with plausible wrong results.

31. The microprocessor of claim 14, further comprising:
an output register for data results capable of providing data containing both correct results and plausible wrong results; and
the correct results provided in word locations in the output register coordinated by the key.

32. The microprocessor of claim 14, wherein:
the key includes the error correction key, and including instruction key information shared with a compiler, the instruction key information used by the compiler to encrypt standard instructions into encrypted instructions; and
data and instructions are provided to a computer via program information include an intentional introduction of errors which are correctable with error correction algorithms, said correction algorithms pre-selected according to the key.

33. The microprocessor of claim 32, wherein said correction algorithms are pre-selected according to long instruction words and changed on a periodic basis by codes provided in the instructions gathered into the instruction buffer.

34. The microprocessor of claim 14, wherein the instruction buffer interdependency checking logic includes any combination of the following:
   multiplexers to select a subset of bits from each long instruction word in the instruction buffer to be logically combined to match a sequencer value;
   a sequencer incremented at times determined by the key and which is reset upon the occurrence of the sequencer reset code in the instruction buffer;
   distribution of bits for one encrypted instruction op code across several long instruction words in the instruction buffer;
   distribution of several encrypted instruction op codes around the long instruction words in the instruction buffer;
   a program counter which does not normally increment by one, but which increments by some other constant or variable amount determined by the serial number, the key, and the sequencer value so that encrypted instruction op codes which will be used sequentially in time do not occur sequentially in the instruction buffer, and for which, the time sequential chosen instruction op codes are selected by the multiplexer controlled by the key, the serial number, and the sequencer;
   error correction circuits controlled by the key, sequencer, and supplementary error correcting codes received from the instruction buffer by means of the multiplexers; and
   dependency validation codes received through the multiplexer of the instruction buffer checked by logic circuits that depend on the key, the serial number, instruction bits, and camouflage bits.

35. The microprocessor of claim 34, further comprising dependency validation codes received through the multiplexer of the instruction buffer checked by logic circuits that depend on the key, the serial number, instruction bits, and camouflage bits so that incorrect validation bits provide an alarm.

36. The microprocessor of claim 35, wherein upon receipt of said alarm, the interdependency checking logic writes an audit code and is capable of terminating program execution.

37. The microprocessor of claim 14, further comprising:
   a plurality of storage locations for keys, with the keys further determining storage locations of satellite keys and satellite access flags, said locations intentionally varied;
   key-dependent storage of remote access approval flags, the remote access approval flags encoded so as to obscure the locations of said approval flags;
   logic circuitry for using a null key for a default unencrypted instruction set with partitioning of memory resources between those used for with null key programs and those used for the keyed programs; and
   logic circuitry for selecting from any of several stored keys so that several independent encrypted and unencrypted programs may be executed sequentially by installing each different key when needed, which also reallocates memory and register resources that are securely partitioned from each other.

38. The microprocessor of claim 37, further comprising logic for requiring network handshaking, the network handshaking further used to provide additional key information for continued operation.

39. Method for processing computer programs selectively operable on one or more selected individual processors, comprising routing a subset of the instruction bits from selected bit locations in the buffer to destination logic circuitry, the routing causing signals to reach a programmable instruction decoder and an instruction buffer interdependency checking logic block, wherein successful program execution requires a successful interdependency check at the interdependency checking logic block.

40. The method of claim 39, further comprising:
   providing reconfigurable logic gates;
   using a portion of the reconfigurable logic gates for calculating the results of the execution of an instruction;
   accepting correct data operands and plausible wrong data operands; and
   outputting correct results along with plausible wrong results.

41. The method of claim 39, further comprising:
   providing program instructions in a pipeline architecture; and
   establishing information keys as instruction security commands at a plurality of steps in said pipeline architecture, wherein an arithmetic logic unit (ALU) provides variability of logic circuitry for execution of encrypted instruction op codes or standard instruction op codes that provide standard instruction operation types.

42. The method of claim 41, further comprising providing a choice of using encrypted instructions or standard instructions.

43. The method of claim 42, further comprising:
   providing a key shared with a compiler;
   encrypting standard instructions with the compiler using the key; and
   coordinating the routing of the subset of instruction bits using the key and the encrypted instructions.

44. The method of claim 39, further comprising:
   providing a key shared with a compiler;
   controlling the routing of the subset of instructions using the key;
   providing data containing both correct results and plausible wrong results at an output register; and
   providing the correct results in word locations in the output register coordinated by the key.

45. The method of claim 39, further comprising:
   providing a plurality of storage locations for keys;
   using the keys to determine storage locations of satellite keys and satellite access flags;
   intentionally varying said storage locations for the satellite keys;
   providing key-dependent storage of remote access approval flags;
   encoding the remote access approval flags so as to obscure the locations of said approval flags;
   using a null key for a default unencrypted instruction set with partitioning of memory resources between those used for with null key programs and those used for the keyed programs; and
   selecting any of several stored keys so that several independent encrypted and unencrypted programs may be executed sequentially by installing each different key when needed, which also reallocates memory and register resources that are securely partitioned from each other.

46. Method of processing program instructions for execution on selected ones of individual processors, comprising routing a subset of the instruction bits from selected bit locations in the buffer to destination logic circuitry, the routing causing signals to reach a programmable instruction decoder and an instruction buffer interdependency checking logic block, wherein successful program execution requires a successful interdependency check at the interdependency checking logic block.

47. The method of claim 46, further comprising establishing information keys as instruction security commands at a plurality of steps in a pipeline architecture, wherein an arithmetic logic unit (ALU) provides variability of logic circuitry for execution of encrypted instruction op codes or standard instruction op codes that provide standard instruction operation types.

48. The method of claim 46, further comprising:
providing a key shared with a compiler; and
controlling the routing of the subset of instructions using the key.

\* \* \* \* \*